United States Patent
Ide et al.

(10) Patent No.: US 8,118,117 B2
(45) Date of Patent: *Feb. 21, 2012

(54) THRUST BEARING ASSEMBLY

(75) Inventors: Russell D. Ide, Charlestown, RI (US);
Russell C. Ide, West Kingston, RI (US)

(73) Assignee: Ceradyne, Inc., Costa Mesa, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/433,527

(22) Filed: Apr. 30, 2009

(65) Prior Publication Data

US 2009/0268995 A1 Oct. 29, 2009

Related U.S. Application Data

(63) Continuation-in-part of application No. 11/948,552, filed on Nov. 30, 2007, now Pat. No. 7,712,550, which is a continuation-in-part of application No. 11/148,178, filed on Jun. 9, 2005, now Pat. No. 7,306,059.

(60) Provisional application No. 61/049,632, filed on May 1, 2008.

(51) Int. Cl.
*E21B 4/00* (2006.01)
*F16C 17/04* (2006.01)

(52) U.S. Cl. ............... 175/107; 384/97; 384/420

(58) Field of Classification Search .............. 175/107; 384/424, 97, 121, 122, 124, 223–225, 303, 384/304, 420; 166/105, 107
See application file for complete search history.

(56) References Cited

U.S. PATENT DOCUMENTS

| 3,054,595 A | 9/1962 | Kaufman |
| 3,858,668 A | 1/1975 | Bell |
| 3,893,737 A | 7/1975 | Tyson |
| 3,982,797 A | 9/1976 | Tschirky et al. |
| 4,168,101 A | 9/1979 | DiGrande |
| 4,323,285 A | 4/1982 | Gilson |
| 4,345,798 A | 8/1982 | Cortes |
| 4,496,251 A | 1/1985 | Ide |

(Continued)

FOREIGN PATENT DOCUMENTS

FR 2 157 206 6/1973

(Continued)

OTHER PUBLICATIONS

European Search Report dated Aug. 29, 2008.

(Continued)

*Primary Examiner* — Shane Bomar
*Assistant Examiner* — Catherine Loikith
(74) *Attorney, Agent, or Firm* — Plumsea Law Group, LLC

(57) ABSTRACT

A thrust bearing assembly comprising a bearing runner and a bearing carrier, the carrier defining thrust pad sites annularly around the carrier, with a thrust pad disposed at a site and with the carrier limiting movement of the thrust pad in a direction generally radial to the longitudinal axis of the runner while allowing the thrust pad to move in a direction generally parallel to the longitudinal axis. The pads can tilt under load to form a hydrodynamic wedge. A runner may have a wear resistant face. In one implementation, at each site, a deflection element (e.g., Belleville washer) is at least partially disposed within a cavity and a pad is disposed over the deflection element. The wear resistant face contacts the pad. Another embodiment rigidly connects pads disposed on opposite sides of a stationary bearing carrier. Another embodiment attaches pads to a bearing carrier using pad holder assemblies.

30 Claims, 23 Drawing Sheets

U.S. PATENT DOCUMENTS

| | | | |
|---|---|---|---|
| 4,515,486 A | 5/1985 | Ide |
| 4,526,482 A | 7/1985 | Ide |
| 4,560,014 A | 12/1985 | Geczy |
| 4,676,668 A | 6/1987 | Ide |
| 4,720,199 A | 1/1988 | Geczy et al. |
| 4,738,453 A | 4/1988 | Ide |
| 4,877,257 A | 10/1989 | Ide |
| 5,007,490 A | 4/1991 | Ide |
| 5,007,491 A | 4/1991 | Ide |
| 5,013,947 A | 5/1991 | Ide |
| 5,033,871 A | 7/1991 | Ide |
| 5,037,212 A | 8/1991 | Justman et al. |
| 5,048,622 A | 9/1991 | Ide |
| 5,048,981 A | 9/1991 | Ide |
| 5,054,938 A | 10/1991 | Ide |
| 5,066,144 A | 11/1991 | Ide |
| 5,074,681 A | 12/1991 | Turner et al. |
| 5,092,687 A | 3/1992 | Hall |
| 5,096,004 A | 3/1992 | Ide |
| 5,102,236 A | 4/1992 | Ide |
| 5,102,237 A | 4/1992 | Ide |
| 5,112,143 A | 5/1992 | Ide |
| 5,125,754 A | 6/1992 | Ide |
| 5,135,060 A | 8/1992 | Ide |
| 5,136,739 A | 8/1992 | Ide |
| 5,137,373 A | 8/1992 | Ide |
| 5,139,400 A | 8/1992 | Ide |
| 5,142,174 A | 8/1992 | Ide |
| 5,156,443 A | 10/1992 | Ide |
| 5,165,140 A | 11/1992 | Ide |
| 5,203,438 A | 4/1993 | Ide |
| 5,203,808 A | 4/1993 | Ide |
| 5,213,421 A | 5/1993 | Ide |
| 5,213,545 A | 5/1993 | Ide |
| 5,215,385 A | 6/1993 | Ide |
| 5,222,815 A | 6/1993 | Ide |
| 5,246,295 A | 9/1993 | Ide |
| 5,248,204 A | 9/1993 | Livingston et al. |
| 5,254,893 A | 10/1993 | Ide |
| 5,255,984 A | 10/1993 | Ide |
| 5,275,493 A | 1/1994 | Ide |
| 5,281,033 A | 1/1994 | Ide |
| 5,284,392 A | 2/1994 | Ide |
| 5,304,006 A | 4/1994 | Ide |
| 5,321,328 A | 6/1994 | Ide |
| 5,372,431 A | 12/1994 | Ide |
| 5,377,802 A | 1/1995 | Ide |
| 5,382,097 A | 1/1995 | Ide |
| 5,385,409 A | 1/1995 | Ide |
| 5,393,145 A | 2/1995 | Ide |
| 5,403,154 A | 4/1995 | Ide |
| 5,417,612 A | 5/1995 | Ide |
| 5,421,655 A | 6/1995 | Ide et al. |
| 5,425,584 A | 6/1995 | Ide |
| 5,441,347 A | 8/1995 | Ide |
| 5,447,472 A | 9/1995 | Ide |
| 5,455,778 A | 10/1995 | Ide et al. |
| 5,459,674 A | 10/1995 | Ide et al. |
| 5,489,155 A | 2/1996 | Ide |
| 5,499,705 A | 3/1996 | Ide |
| 5,503,479 A | 4/1996 | Ide |
| 5,513,917 A | 5/1996 | Ide et al. |
| 5,515,458 A | 5/1996 | Ide |
| 5,531,522 A | 7/1996 | Ide et al. |
| 5,556,208 A | 9/1996 | Ide |
| 5,558,444 A | 9/1996 | Ide |
| 5,559,383 A | 9/1996 | Ide |
| 5,564,836 A | 10/1996 | Ide et al. |
| 5,603,574 A | 2/1997 | Ide et al. |
| 5,620,260 A | 4/1997 | Ide |
| 5,660,481 A | 8/1997 | Ide |
| 5,743,654 A | 4/1998 | Ide et al. |
| 5,833,541 A | 11/1998 | Turner et al. |
| 6,190,050 B1 | 2/2001 | Campbell |
| 7,306,059 B2 | 12/2007 | Ide |
| 7,712,550 B2 | 5/2010 | Ide |
| 8,016,052 B2 | 9/2011 | Ide |
| 2004/0241021 A1 | 12/2004 | Ide et al. |
| 2005/0271311 A1 | 12/2005 | Saville et al. |
| 2006/0278439 A1 | 12/2006 | Ide |
| 2007/0092169 A1 | 4/2007 | Johnson |
| 2010/0187014 A1 | 7/2010 | Ide |

FOREIGN PATENT DOCUMENTS

FR      2157206      6/1973

OTHER PUBLICATIONS

Notification Concerning Transmittal of International Preliminary Report on Patentability mailed Nov. 11, 2010 in PCT Application No. PCT/US2009/042515.
International Search Report & Written Opinion; Dated Oct. 29, 2009.
Office Action Mailed Sep. 9, 2010 in U.S. Appl. No. 12/753,139.
International Search Report and Written Opinion from related PCT Application No. PCT/US2009/042515 dated Oct. 29, 2009.
European Search Report mailed Aug. 28, 2008 in European Application No. EP06114354.1.
Office Action mailed Jul. 16, 2009 in U.S. Appl. No. 11/948,552.
Response to Office Action filed Nov. 16, 2009 in U.S. Appl. No. 11/948,552.
Notice of Allowance mailed Dec. 9, 2009 in U.S. Appl. No. 11/948,552.
Amendment filed Mar. 2, 2010 in U.S. Appl. No. 11/948,552.
Response to Amendment under Rule 312 mailed Mar. 22, 2010 in U.S. Appl. No. 11/948,552.
Notice of Allowance mailed Aug. 3, 2007 in U.S. Appl. No. 11/148,178.
Response to Office Action filed Dec. 10, 2010 in U.S. Appl. No. 12/753,139.
Notice of Allowance mailed May 5, 2011 in U.S. Appl. No. 12/753,139.
312 Amendment filed Jun. 30, 2011 in U.S. Appl. No. 12/753,139.

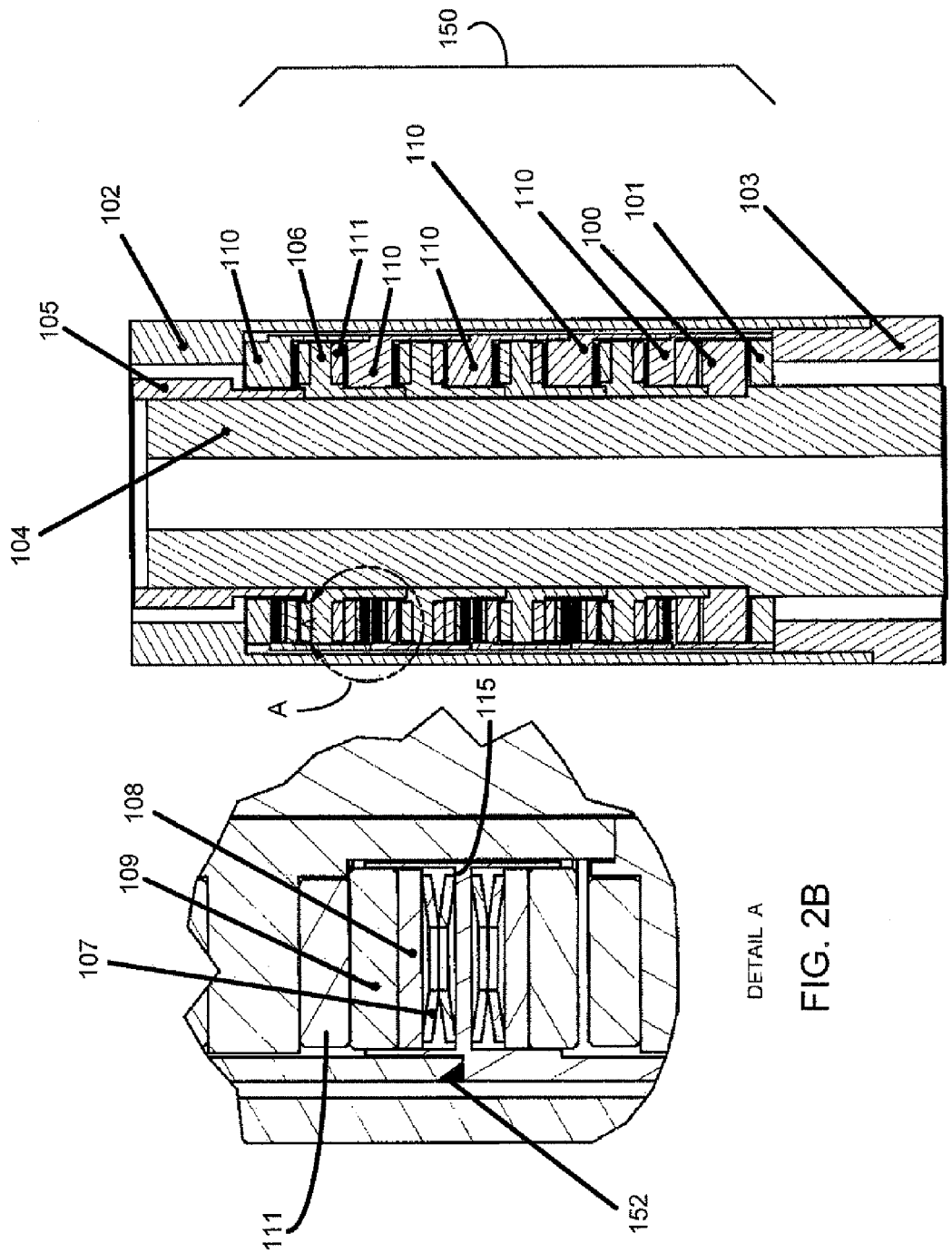

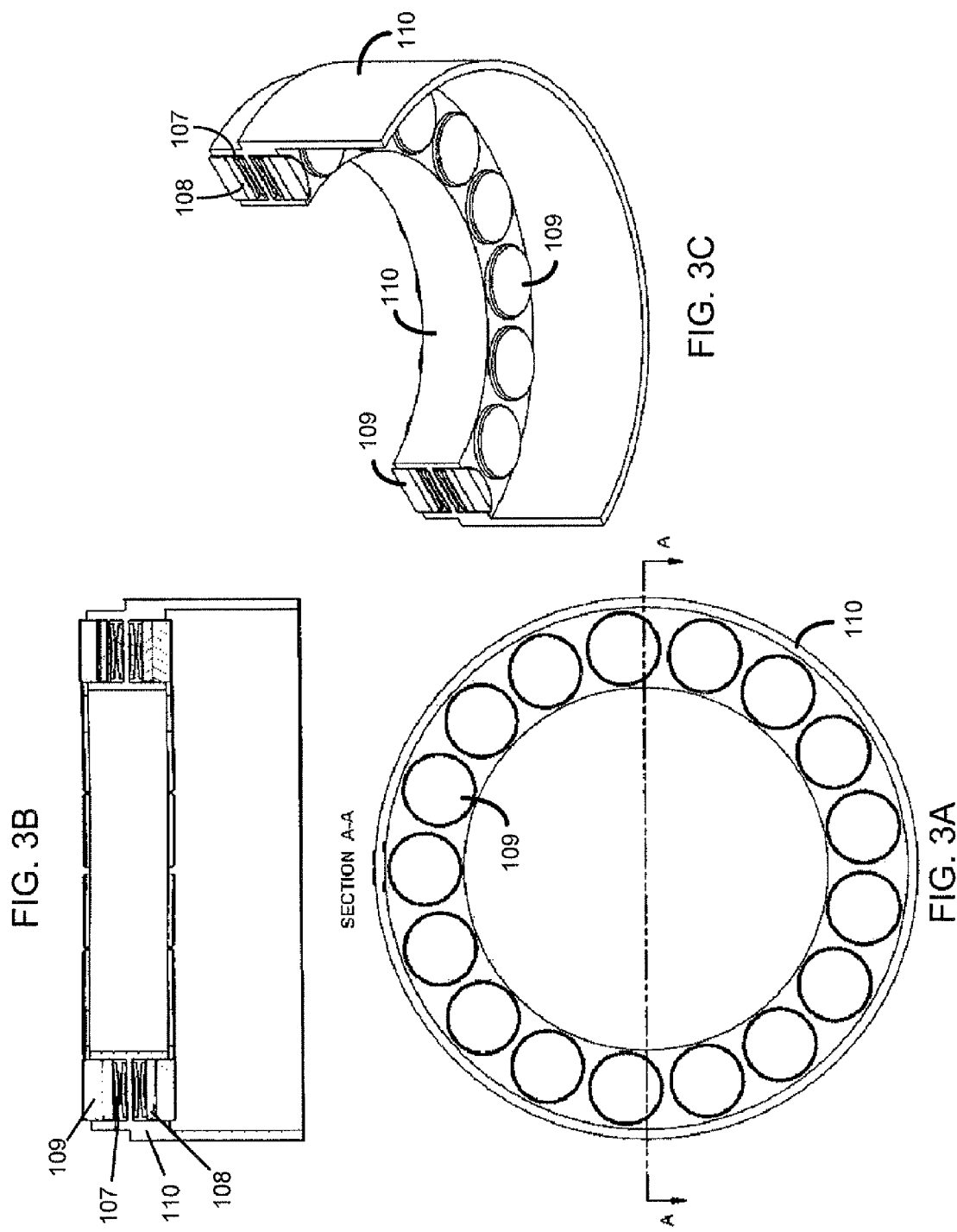

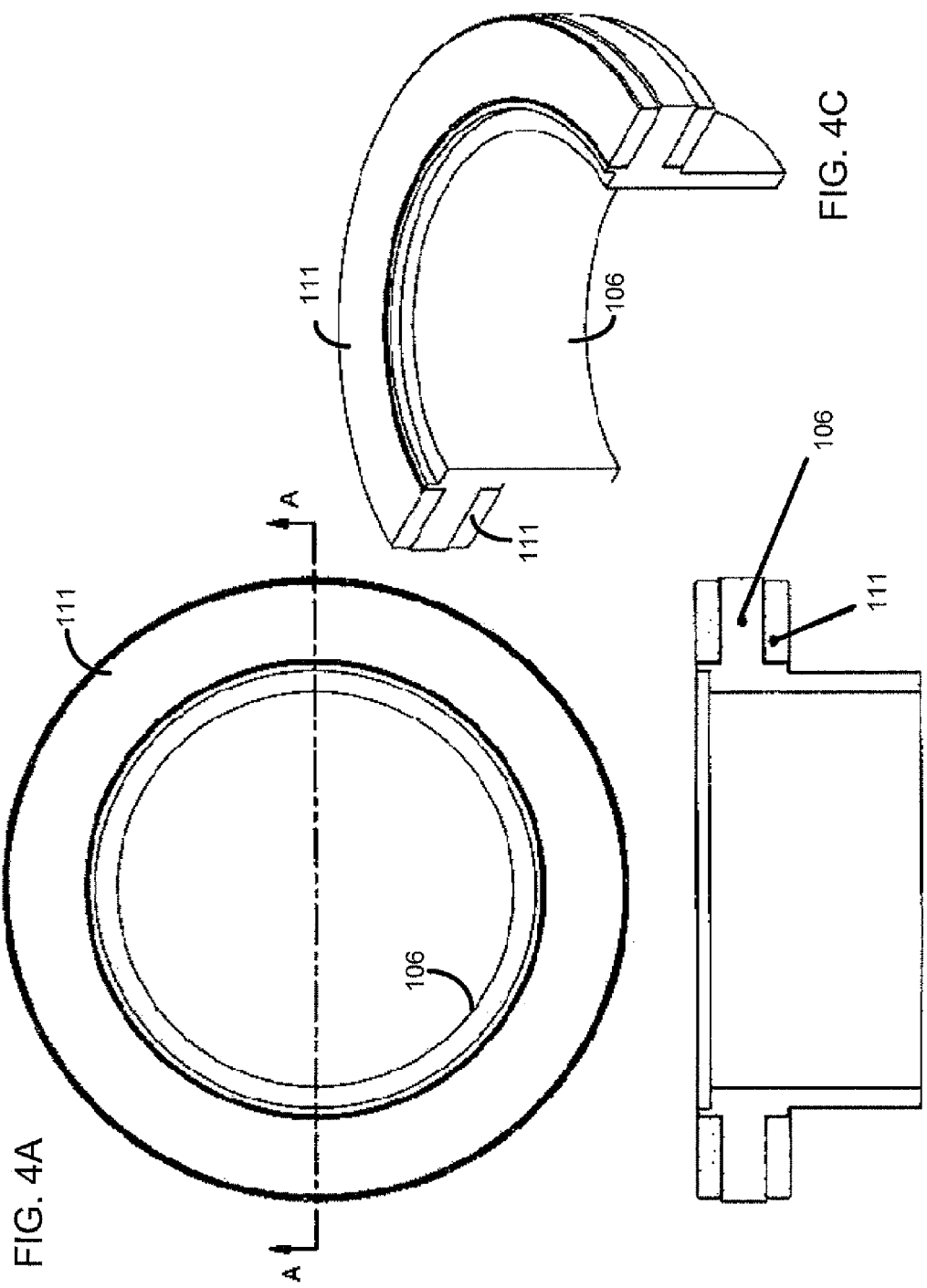

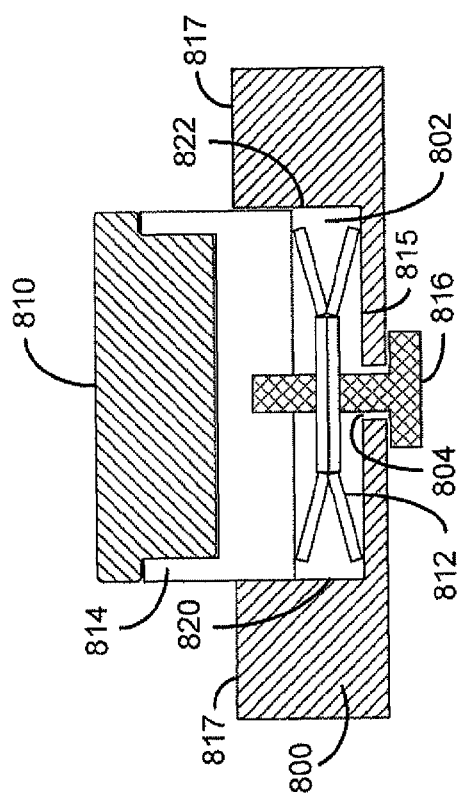
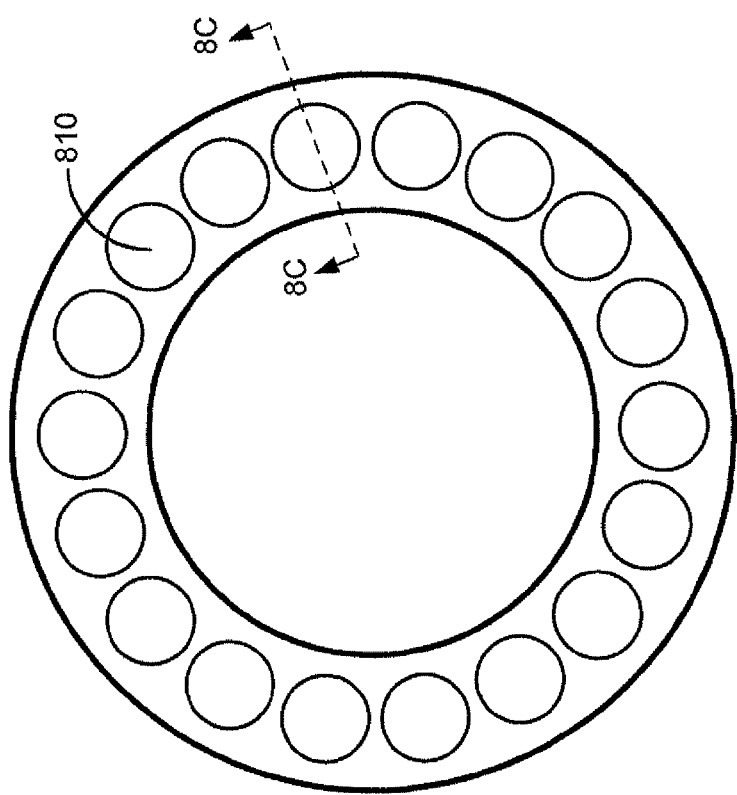
FIG. 8C
FIG. 8B

THRUST BEARING ASSEMBLY

This application claims the benefit of U.S. Provisional Application No. 61/049,632, filed May 1, 2008, which is herein incorporated by reference in its entirety. This application is also a continuation-in-part of U.S. patent application Ser. No. 11/948,552, filed Nov. 30, 2007 now U.S. Pat. No. 7,712,550, which is a continuation-in-part of U.S. patent application Ser. No. 11/148,178, filed Jun. 9, 2005, now U.S. Pat. No. 7,306,059, issued Dec. 11, 2007, all of which are herein incorporated by reference in their entirety.

BACKGROUND

1. Field of the Invention

The present invention relates to thrust bearing assemblies, and more particularly to a hydrodynamic thrust bearing assembly having thrust pads mounted on one or more resilient deflection elements, such as Belleville washers.

2. Background of the Invention

Most conventional downhole drilling motors use rolling element-type bearings, such as ball rollers or angular contact rollers. U.S. Pat. No. 5,074,681 to Turner et al. discloses an example of ball rollers. U.S. Pat. No. 5,248,204 to Livingston et al. discloses an example of angular contact rollers. Typically, these rolling element-type bearings are lubricated by the drilling fluid (mud) or by clean oil when encased in a sealed oil chamber. Due to the high loads, pressure, and abrasive conditions, bearing life is typically only several hundred hours.

Motors typically have a multiple number of bearings. The bearings can be resiliently supported on Belleville washers to equalize loading among bearings and to absorb shock. Rolling element-type bearings are not tolerant of abrasives and thus wear quickly when exposed to mud lubrication. Once wear occurs, loads between the individual balls become uneven and wear rates accelerate. Indeed, rolling element balls taken from failed units are sometimes half their original diameter. For the oil-lubricated bearings, once the seals fail, wear occurs in a similar way.

Another type of bearing used in downhole drilling motors is a hydrodynamic or sliding surface type. U.S. Pat. No. 4,560,014 to Geczy discloses an example of this hydrodynamic bearing type, which uses rigidly mounted pads manufactured of industrial diamond. The diamond pads are mud-lubricated and slide against each other. These bearings, however, are extremely expensive and only marginally increase service life.

Other examples of hydrodynamic bearings are disclosed in the inventor's previous U.S. Pat. No. 5,441,347 to Ide and U.S. Pat. No. 5,620,260 also to Ide, both of which are incorporated herein by reference. These pad type hydrodynamic thrust bearings include a carrier and a plurality of bearing pads circumferentially spaced about the carrier. The pads may be provided with individual support structures and supported in the carrier, or may be integrally formed with the carrier.

SUMMARY OF THE INVENTION

An embodiment of the present invention provides a hydrodynamic thrust bearing assembly in which each thrust pad is individually mounted on a deflection element. Rather than mounting an entire bearing having fixed pads on a resilient member (e.g., spring), the present invention resiliently mounts the individual thrust pads, thereby avoiding costly finish-grinding/lapping of the complete bearing assembly. The pads are supported with sufficient freedom of movement to ensure that the pads deflect under heavy loading to form a fluid film wedge as is known from the inventor's earlier patents including U.S. Pat. No. 5,382,097; U.S. Pat. No. 5,503,479; U.S. Pat. No. 5,441,347; U.S. Pat. No. 5,284,392; U.S. Pat. No. 5,137,373; and U.S. Pat. No. 5,112,143, all of which are herein incorporated by reference in their entirety.

An exemplary thrust bearing assembly according to an embodiment of the present invention comprises a rotating bearing runner having a wear resistant face and a stationary bearing carrier defining a plurality of cavities disposed annularly around the carrier. A deflection element is disposed in a cavity of the plurality of cavities and a pad is disposed over the deflection element. The pad is at least partially disposed within the cavity. The wear resistant face of the rotating bearing runner contacts the pad.

Another embodiment of the present invention provides a thrust bearing assembly for a downhole motor comprising a first stationary bearing carrier defining a first plurality of cavities disposed annularly around the first stationary bearing carrier, a second stationary bearing carrier defining a second plurality of cavities disposed annularly around the second stationary bearing carrier, and a rotating bearing runner disposed between the first stationary bearing carrier and the second stationary bearing carrier. The rotating bearing runner has a first wear resistant face and a second wear resistant face. Each cavity of the first plurality of cavities and the second plurality of cavities holds a deflection element and a pad disposed over the deflection element. The first wear resistant face is in contact with the pads of the first stationary bearing carrier. The second wear resistant face is in contact with the pads of the second stationary bearing carrier.

Another embodiment of the present invention provides a downhole drilling apparatus that includes a progressive cavity drive train. The apparatus comprises a housing structure, a stator, a rotor, and a thrust bearing assembly. The stator has a longitudinal axis. The rotor has a true center and is located within the stator. The stator and the rotor each have coacting helical lobes that are in contact with one another at any transverse section. The stator has one more helical lobe than the rotor such that a plurality of progressive cavities is defined between the rotor and the stator. The rotor is adapted to rotate within the stator such that the true center of the rotor orbits the axis of the stator. The orbit has a predetermined radius and the orbiting motion of the rotor causes a progression of the progressive cavities in the direction of the axis of the stator. The thrust bearing assembly is coupled to the rotor and comprises a rotating bearing runner having a wear resistant face and a stationary bearing carrier defining a plurality of cavities disposed annularly around the carrier. A deflection element is disposed in a cavity of the plurality of cavities and a pad is disposed over the deflection element. The pad is at least partially disposed within the cavity. The wear resistant face of the rotating bearing runner contacts the pad.

Another embodiment of the present invention provides a thrust bearing assembly in which pads disposed opposite to each other on opposite sides of a bearing carrier are rigidly connected to each other, such that the two pads move in unison. For example, on a first side of a bearing carrier, a first pad mounted over a first deflection element can be rigidly connected to a second pad mounted over a second deflection element disposed on a second side of the bearing carrier opposite to the first side. In one implementation, the pads are rigidly connected by a pin that passes through the bearing carrier. The pin can be attached to the pads or can include integral or non-integral pad holders in which the pads are disposed. In one implementation, the pin has an integral first pad holder and is mechanically coupled to a second pad holder on the opposite side of the bearing carrier.

A further embodiment of the present invention provides a hydrodynamic thrust bearing assembly comprising a bearing runner having a wear resistant face, a bearing carrier defining at least one annular cavity, a deflection element disposed in the at least one annular cavity, and a pad disposed over the deflection element, the wear resistant face of the bearing runner contacting the pad. The at least one annular cavity could be a single cavity that is disposed around the bearing carrier and holds a plurality of pads. In one implementation, the at least one annular cavity is a single cavity holding a plurality of contiguous pads that form an annular pad over one large or many small deflection elements, such as Belleville washers.

A further aspect of the present invention provides a pad holder assembly that secures a pad to the bearing carrier. The pad holder assembly comprises a pad holder and a fastener that attaches the pad holder to the bearing carrier. The pad holder can be made of metal carbide to which a silicone carbide pad is attached. In one implementation, the pad holder is cup shaped, with the pad disposed inside the cup and projecting above the cup. The fastener of the pad holder assembly can comprise a bolt disposed through a bolt opening in the bearing carrier. The bolt can be configured to move freely within the bolt opening such that the pad holder and pad can float above a surface of the bearing carrier. A deflection element can be disposed between the underside of the holder (i.e., the side of the holder opposite to the side on which the pad is disposed) and the surface of the bearing carrier. The deflection element provides a resistance and deflection appropriate for the deflection element to contact and deflect against the force of the bearing runner.

In a further aspect, instead of a single deflection element, a plurality of deflection elements is provided for each pad holder assembly. For example, two stacked deflection elements can be provided between the underside of the pad holder and a surface of the bearing carrier. As another example, a first deflection element can be provided between the underside of the pad holder and a first side of the bearing carrier, and a second deflection element can be provided between the end of the fastener and the second side of the bearing carrier opposite to the first side.

In using a fastener (e.g., a bolt) to secure the holder assembly to the bearing carrier, the fastener opening can be provided in the center of each cavity when a plurality of equally spaced cavities are provided annularly around the bearing carrier. When a single annular cavity is provided, equally spaced fastener openings can be provided around the single annular cavity, each fastener opening receiving a single fastener attached to a holder and pad.

In a further aspect of the present invention, the surface of the bearing carrier is substantially flat and does not have cavities in which to receive the pads and pad holder assemblies. For example, in one implementation, pad holder assembly openings are provided annularly around a flat bearing carrier. Each opening receives a pad and its pad holder assembly. The fastener of the pad holder assembly is disposed in the opening. A deflection element is disposed between the pad holder and the flat surface of the bearing carrier.

In a further aspect of the present invention, an opening that receives the fastener of a pad holder assembly has a shape other than a circular shape. For example, the opening could be slot shaped. The slot shape enables the pad and pad holder assembly to not only float in a direction perpendicular to the face of the bearing carrier, but also in a direction parallel to the face of the bearing carrier, as well as in any combination of those directions. Permitting the pads to travel in the parallel direction can accommodate manufacturing variances in closely spaced pads and pad holder assemblies, and can make assembly more convenient. Slots can also limit parallel travel during operation, which can provide advantages in properly locating the pads with respect to the bearing runner. As examples, a slot can extend radially from a center point of the bearing carrier or can extend along an arc of the bearing carrier.

In an embodiment, the present invention provides a thrust bearing assembly comprising a bearing runner and a bearing carrier, the carrier defining a plurality of thrust pad sites annularly around the carrier, with a thrust pad disposed at a site and with the carrier limiting movement of the thrust pad in a direction generally radial to the longitudinal axis of the runner while allowing the thrust pad to move in a direction generally parallel to the longitudinal axis. Though the range of movement is limited, the pads can tilt under load to form a hydrodynamic wedge as is known in the art. An embodiment comprises a bearing runner having a wear resistant face and a bearing carrier defining thrust pad sites disposed annularly around the carrier. In one implementation, at each site, a deflection element (e.g., Belleville washer) is disposed in a cavity and a pad is disposed over the deflection element. The pad can be at least partially disposed within the cavity. The wear resistant face contacts the pad. Another embodiment rigidly connects pads disposed on opposite sides of a stationary bearing carrier. Another embodiment attaches pads to a bearing carrier using pad holder assemblies.

BRIEF DESCRIPTION OF THE DRAWINGS

FIG. 2A is a sectional view of an exemplary thrust bearing assembly installed in a downhole motor, according to an embodiment of the present invention.

FIG. 2B is an enlarged view of a portion of the thrust bearing assembly of FIG. 2A.

FIG. 3A is a plan view of an exemplary bearing carrier, according to an embodiment of the present invention.

FIG. 3B is a sectional view of the bearing carrier of FIG. 3A along line A-A.

FIG. 3C is an isometric view of a section of the bearing carrier of FIG. 3A along line A-A.

FIG. 4A is a plan view of an exemplary runner, according to an embodiment of the present invention.

FIG. 4B is a sectional view of the runner of FIG. 4A along line A-A.

FIG. 4C an isometric view of a section of the runner of FIG. 4A along line A-A.

FIG. 8B is a schematic diagram of the bearing carrier of FIG. 8A with multiple pads installed therein, according to an embodiment of the present invention.

FIG. 8C is a schematic diagram that illustrates a cross-sectional view of the bearing carrier of FIG. 8B taken along line 8C-8C.

DETAILED DESCRIPTION OF THE INVENTION

Figure 1:
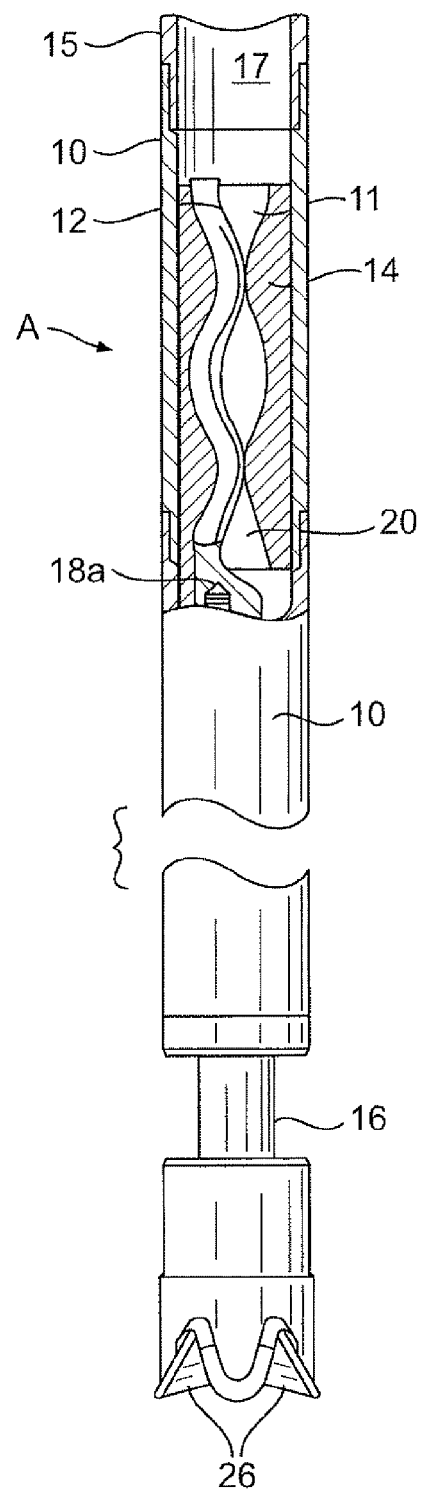
FIG. 1 is an elevation view partly in section of the overall structure of a downhole drilling apparatus according to an embodiment of the present invention.

Embodiments of thrust bearing assemblies are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in schematic diagram form. Furthermore, one skilled in the art can readily appreciate that the specific sequences in which methods are presented and performed are illustrative and it is contemplated that the sequences can be varied and still remain within the spirit and scope of embodiments of the present invention.

An embodiment of the present invention provides a novel, longer life, higher capacity, lower cost hydrodynamic bearing that operates in, for example, a mud-lubricated or sealed oil bath-lubricated drilling motor bearing system. The pad wear surface can be made of a material that is harder than the particles typically found in the mud and that does not wear when maximum loads are kept in approximately the 1000 to 2000 psi range. Examples of suitable pad wear material include silicon carbide and tungsten carbide. Load equalization among individual pads within each bearing can be accomplished by resiliently mounting each thrust pad on deflection elements, such as Belleville washers. This resilient mounting differs from mounting the entire bearing, encompassing fixed pads, on a resilient element (spring), as has been done in the prior art. Indeed, resiliently mounting individual pads eliminates costly finish-grinding/lapping of the complete bearing assembly.

When designed to fit into existing motor bearing envelopes, thrust loading of approximately 1000 psi or less can be achieved. Tests conducted in mud lubrication at these loads have shown virtually no wear. In a preferred embodiment, the present invention includes a number of rotating disc members of abrasion-resistant hard wear surfaces and a number of stationary pad-type bearing members opposite one or both sides of the rotating member. The bearing members comprise pad carriers with a plurality of cavities for fitting hard ceramic wear pads on resilient elements, such as Belleville washers.

In an embodiment of a method for manufacturing a thrust bearing according to the present invention, the components are first loosely assembled. The stationary bearing carriers are then bolted or welded together after assembly with a preload (e.g., a slight compression) on the springs. This construction ensures that all components are held in position for proper alignment. Because of the difficulty in predicting precise loads downhole, the present invention can be designed with an overload protection blank runner that engages prior to bottoming of the Belleville washers. For example, a blank runner can be coupled to a bearing carrier of the thrust bearing assembly and configured to engage a blank overload stop. As used herein, the term "coupled" encompasses a direct connection, an indirect connection, or a combination thereof.

Illustrating one particular application of the present invention, FIG. 1 shows the overall structure of a progressive cavity drilling apparatus in which a hydrodynamic pad type thrust bearing of the present invention can be used. As shown, the apparatus includes a drill string 15, a progressive cavity drive train, a drill bit drive shaft 16, and a drill bit 26. The drive train includes a progressive cavity device and a coupling for converting the motion of the rotor of the progressive cavity device, e.g., orbiting of the rotor and the rotational motion of the rotor, into rotation about a single axis at the same speed. This coupling, which is contained in the lower part of housing 10 and is not visible in FIG. 1, is a joint assembly including one or more thrust bearing members of the present invention. The joint assembly can be, for example, either a mud-lubricated or sealed oil bath-lubricated drilling motor bearing system.

As illustrated in FIG. 1, the progressive cavity device A has a stator, a rotor, a passageway 11 for fluid to enter between the stator and the rotor, and a passageway 20 for the fluid to exit therefrom. In the drawing, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 14 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a shaft connection 18a. The shaft connection allows the rotor 12 to be directed to a stub shaft of the coupling. One end of the coupling is directly connected, by threading, splining, or the like, to the rotor shaft 12. The other end of the coupling is similarly connected to a drill bit drive shaft 16. Typically, the coupling includes separate stub shafts that are connected to the rotor shaft 12 and drive shaft 16 by connecting means such as threads, splines, and the like. Of course, a stub shaft could be integrally formed (connected) to either of these shafts, if desired. The drill bit drive shaft 16 is rotatably connected to a conventional drill bit 26.

The progressive cavity train functions as a fluid motor or driving apparatus for driving the drilling apparatus shown in FIG. 1. Thus, a pressurized fluid, typically water carrying suspended particles commonly referred to as "mud," is forced into the progressive cavity device. The rotor 12 responds to the flowing fluid to produce a rotor driving motion that is simultaneously a rotation, an oscillation, and an orbit. The coupling attached to the rotor 12 at connection point 18a and aligned with the true center of the rotor converts this rotor driving motion into rotational driving motion substantially about a single axis.

FIGS. 2A and 2B show sectional views of an exemplary thrust bearing assembly 150 installed in a downhole motor, according to an embodiment of the present invention. As shown, a drill motor shaft 104 is coupled to a drill bit (not shown) located below the thrust bearing assembly 150. Drill motor shaft 104 is housed in drill casings 102 and 103. Stationary bearing members 110 and 101 are fixed between the drill casings 102 and 103. Stationary bearing members 110 are bearing carriers. Stationary bearing member 101 is a blank overload stop. Bearing carriers 110 and blank overload stop 101 are fixed in the drill string assembly via compressive forces on the top and bottom applied by drill casings 102 and 103.

Rotating bearing runners 106 are locked to the rotating shaft 104 with compressive forces on the top and bottom by the threaded drill casing member 105. Wear resistant inserts 111 (e.g., made of silicon carbide and tungsten carbide) are fitted to rotating bearing runners 106 with adhesive. Optionally, wear resistant inserts 111 can be omitted if rotating bearing runners 106 have integral wear resistant faces. For example, bearing runners 106 can be entirely made from a wear resistant material, such as silicon carbide and tungsten carbide.

Each stationary bearing carrier 110 includes one or more thrust pads. Each thrust pad can be resiliently mounted within an individual cavity. In one embodiment shown in FIG. 3A and discussed below, the individual thrust pads are disposed annularly around a carrier. As shown in the cross-sectional view of FIG. 2B, a pad 109 can be resiliently mounted on a deflection element 107 within a counterbore 115 of bearing carrier 110. In this case, pad 109 is a hard ceramic disc and deflection element 107 is a resilient washer, such as a Belleville washer. A steel disc 108 can optionally be provided between the pad 109 and deflection element 107 to uniformly distribute the deflection element loads to the bottom of the pad 109 to eliminate any stress risers.

As shown in FIG. 2A, to provide overload protection, an exemplary thrust bearing assembly of the present invention can include a blank steel runner 100 that engages the blank overload stop 101 just prior to bottoming of the deflection elements 107.

Figure 2C:
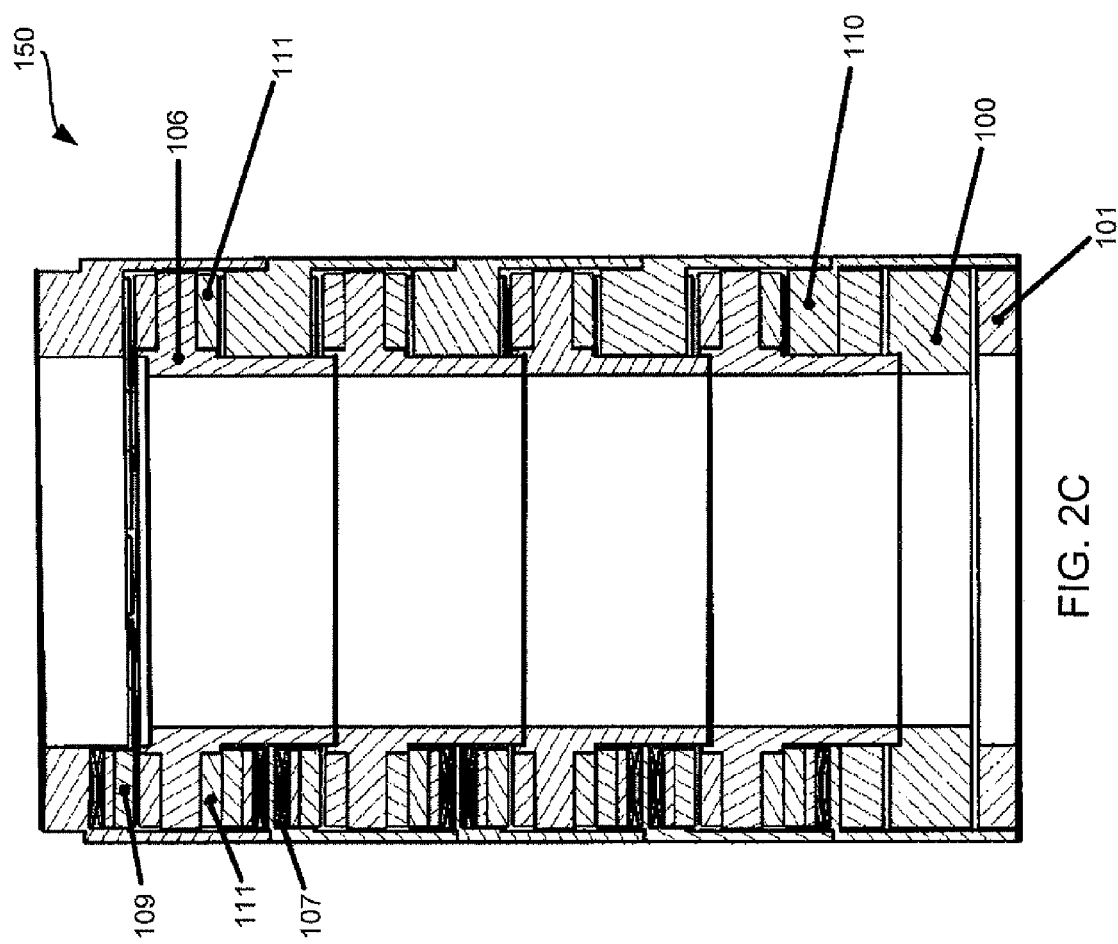
FIG. 2C is a sectional view of the thrust bearing assembly of FIG. 2A prior to welding.

As shown in FIG. 2B, welds 152 at the base of each bearing carrier 110 lock the entire assembly together and hold the individual components in position. FIG. 2C illustrates a sectional view of bearing assembly 150 prior to this welding, showing blank overload stop 101, blank steel runner 100, stationary bearing carrier 110, rotating bearing runners 106, and a pad 109 (e.g., a ceramic wear disc) assembled together.

FIGS. 3A-3C illustrate an exemplary bearing carrier 110 for use in a thrust bearing assembly of an embodiment of the present invention. As shown in FIGS. 3A and 3C, bearing carrier 110 includes a bearing carrier housing having two groups of cavities annularly disposed around the carrier. The first group faces in one direction generally along the axis of the carrier 110, and the second group faces in generally the opposite direction along the axis. A deflection element 107 is disposed in each cavity. A pad 109 (e.g., a wear resistant insert) is disposed over each deflection element 107. Optionally, a load distribution washer 108 is disposed between the deflection element 107 and the pad 109. Deflection element 107 is a resilient washer, such as a Belleville washer. Load distribution washer 108 is a steel disc, for example. Pad 109 is, for example, an abrasion resistant circular pad as shown. In one embodiment, deflection element 107, load distribution washer 108, and pad 109 are loosely assembled within cavity 115, are held in place by the confines of cavity 115 and by bearing runner 106 (specifically, insert 111, if provided), and are not attached to each other.

In an aspect of the present invention, as shown in FIGS. 2B, 3B, and 3C, pad 109 is at least partially disposed within cavity 115. In this manner, movement of pad 109 is substantially limited in a direction radially within cavity 115, but has much greater freedom to move axially as deflection element 107 compresses and expands. Thus, each pad 109 can tilt to form a hydrodynamic wedge and float axially within its cavity 115 as bearing runner 106 rotates and contacts pads 109. Such independent axial movement provides load equalization among the individual pads within the bearing carrier 110.

Figure 2D:
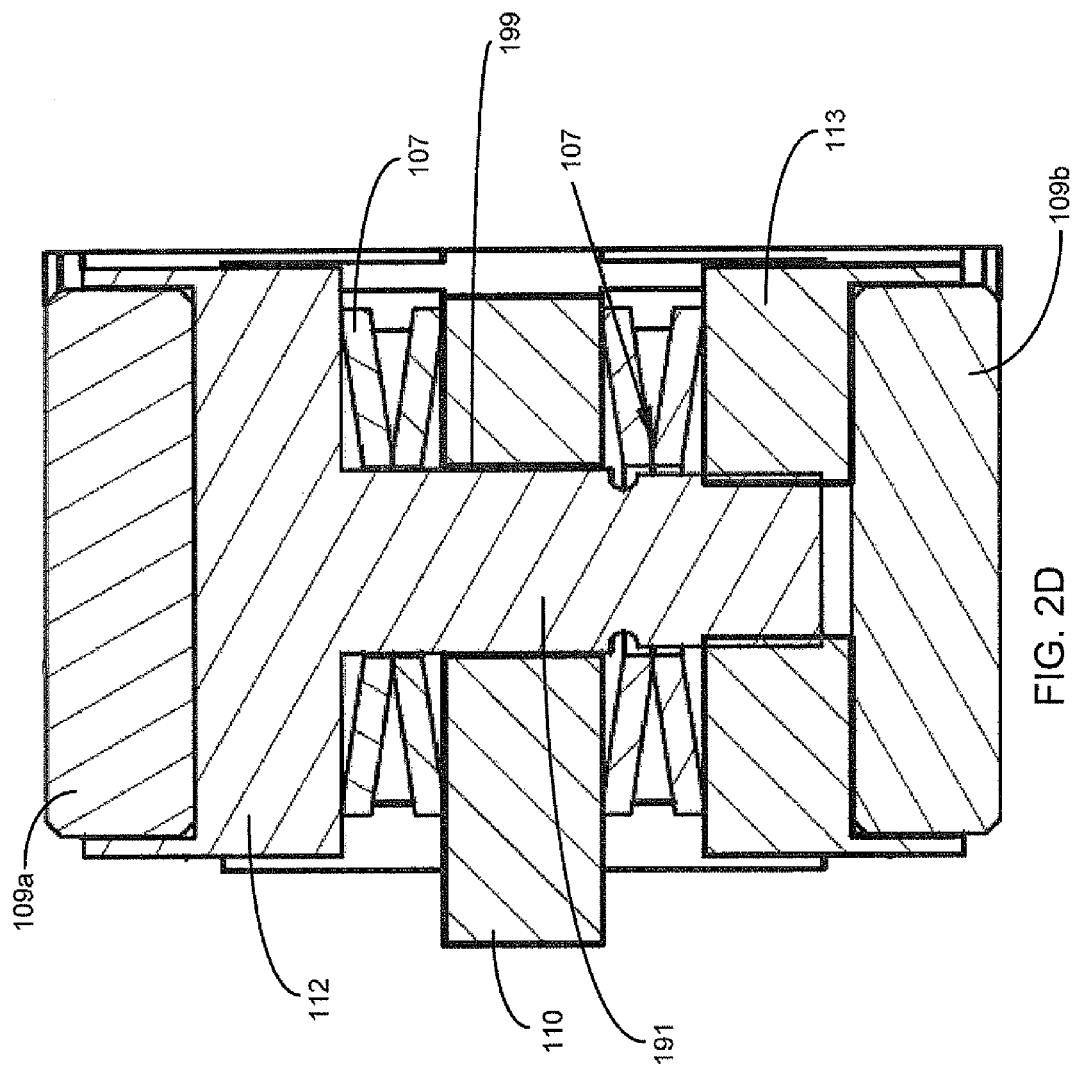
FIG. 2D is an enlarged sectional view of an exemplary thrust bearing assembly having rigidly connected opposing pads, in this case connected by a pin, according to an embodiment of the present invention.

FIG. 2D illustrates an enlarged sectional view of an exemplary thrust bearing assembly having rigidly connected opposing pads, according to a further embodiment of the present invention. As shown in this example, the assembly includes a bearing carrier 110, a first pad 109*a* disposed on a first side of bearing carrier 110, a second pad 109*b* disposed on a second side of the bearing carrier 110 opposite to the first side and rigidly connected to the first pad 109*a* through an opening 199 defined in the bearing carrier 110, and one or more deflection elements 107 disposed between pad 109*a* and bearing carrier 110 and/or between pad 109*b* and bearing carrier 110. The rigid connection between pads 109*a*, 109*b* enables the pads 109*a*, 109*b* to move in unison and to maintain a constant spacing between the pads 109*a*, 109*b* and between adjacent runners. Pad 109*a* could, for example, be on the top or downthrust side of bearing carrier 110, with pad 109*b* on the bottom or upthrust side. The pads 109*a*, 109*b* move relative to the bearing carrier 110.

The rigid connection between pads 109*a*, 109*b* can be accomplished in a number of ways. For example, pads 109*a*, 109*b* can be integrally formed with an interconnecting member between them, thereby forming a unitary part. As another example, a separate member could be attached to both pads 109*a* and 109*b*, for example, by welding or an adhesive.

In another embodiment, the pads 109*a*, 109*b* are disposed in pad holders, wherein the pad holders are connected to each other. For example, as illustrated in FIG. 2D, pad 109*a* can be disposed in a pad holder 112 having an integral pin portion 191 extending therefrom. As shown, the pin portion 191 extends through the opening 199 in the bearing carrier 110. Pin portion 191 is not fixed to the bearing carrier 110 and can move within opening 199 at least in a direction generally from pad 109*a* to pad 109*b* (e.g., a vertical direction in FIG. 2D). The distal end of pin portion 191 is mechanically coupled to another pad holder 113 in which pad 109*b* is disposed. In this manner, pad 109*a* and pad holder 112 (with integral pin portion 191) are rigidly connected to pad holder 113 and pad 109*b*.

By providing a rigid pad-to-pad connection, the pads 109*a*, 109*b* move together and maintain a constant spacing among the runners and pads. This spacing minimizes shock loading when loads change across the bearing carrier, e.g., when loads change from downthrust to upthrust and vice versa. Indeed, surprisingly, the gap provided by the rigid connection dramatically reduces the negative effect of a transitional shock.

FIGS. 4A-4C illustrate an exemplary bearing runner 106 for use in a thrust bearing assembly of an embodiment of the present invention. Bearing runner 106 rotates with the drill motor shaft. As shown best in FIG. 4B, bearing runner 106 includes a bearing runner housing with wear resistant, or abrasion resistant, rings 111 that are fitted to the runner, for example, by adhesive. Optionally, rings 111 can be omitted if bearing runner 106 has integral wear resistant faces.

A further embodiment of the present invention provides a hydrodynamic thrust bearing assembly comprising a bearing runner having a wear resistant face, a bearing carrier defining at least one annular cavity, a deflection element disposed in the at least one annular cavity, and a pad disposed over the deflection element, the wear resistant face of the bearing runner contacting the pad. In this arrangement, the bearing carrier can be stationary and the bearing runner can rotate. The at least one annular cavity could be a single cavity that is disposed around the bearing carrier and holds a plurality of pads. FIGS. 5A-5F illustrate exemplary implementations of this embodiment.

Figure 5A:
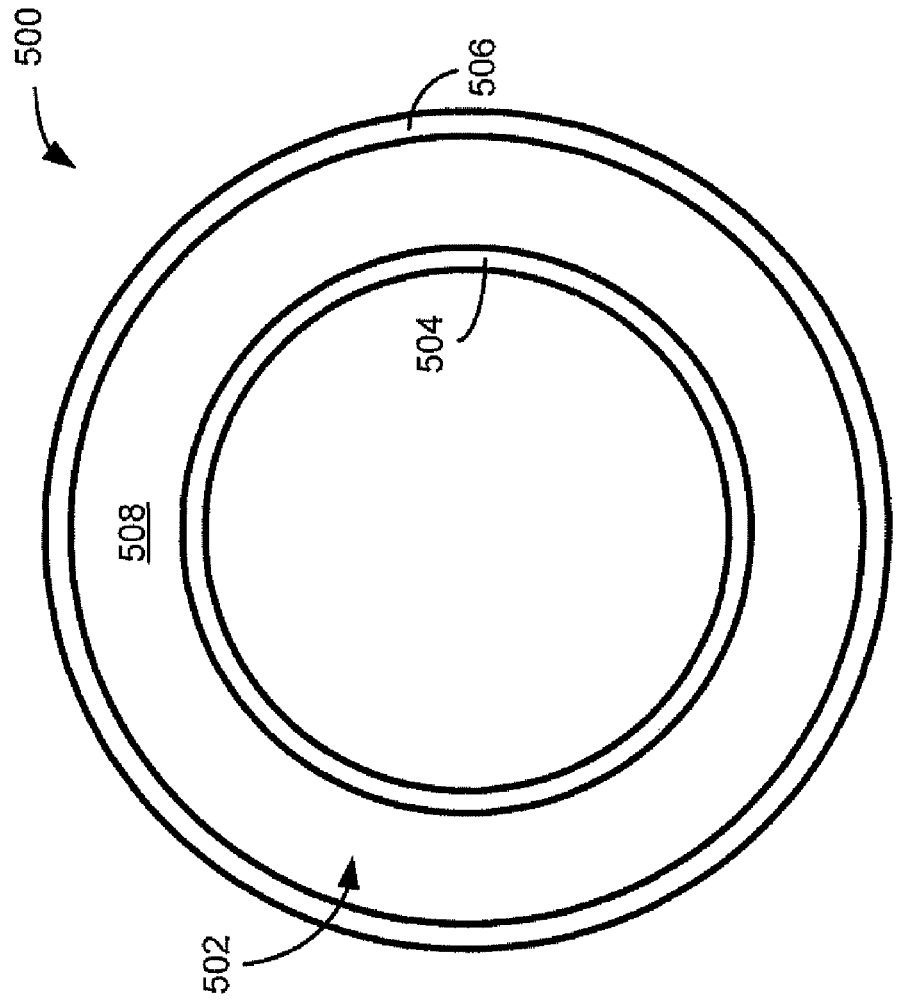
FIG. 5A is a schematic diagram that illustrates a bearing carrier having a single annular cavity, according to an embodiment of the present invention.
Figure 5C:
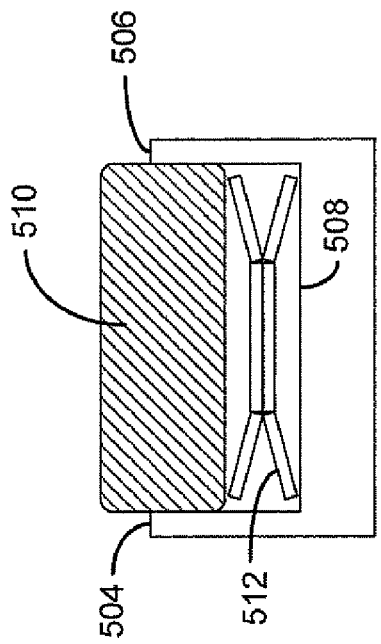
FIG. 5C is a schematic diagram that illustrates a cross-sectional view of the bearing carrier of FIG. 5B taken along line 5C-5C.
Figure 5B:
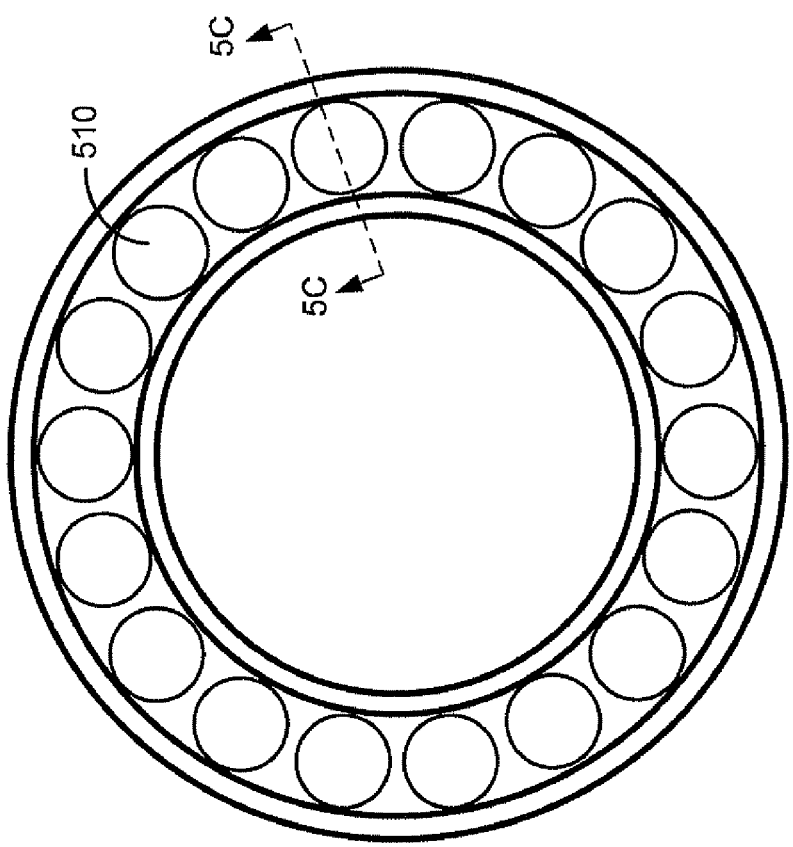
FIG. 5B is a schematic diagram of the bearing carrier of FIG. 5A with multiple pads installed therein, according to an embodiment of the present invention.

FIG. 5A illustrates a stationary bearing carrier 500 having a single annular cavity 502 defined by walls 504, 506 and planar surface 508. The cavity 502 can hold multiple pads 510, as shown in the example of FIG. 5B. Each of the pads 510 can be disposed over a deflection element 512, as shown in the cross-sectional view of FIG. 5C. Alternatively, more than one of the pads 510 can be disposed over a single deflection element. In addition, all of the pads 510 can be disposed over a single deflection element. For example, FIG. 5F illustrates a single deflection element 520 disposed in the cavity 502, over which multiple pads can be placed.

Figure 5E:
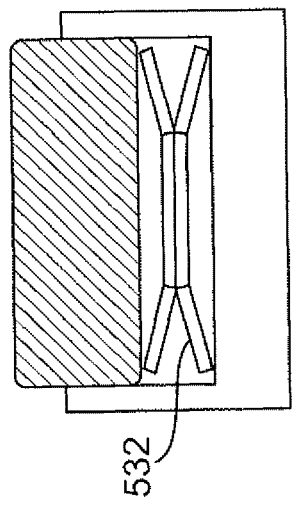
FIG. 5E is a schematic diagram that illustrates a cross-sectional view of the bearing carrier of FIG. 5D taken along line 5E-5E.
Figure 5D:
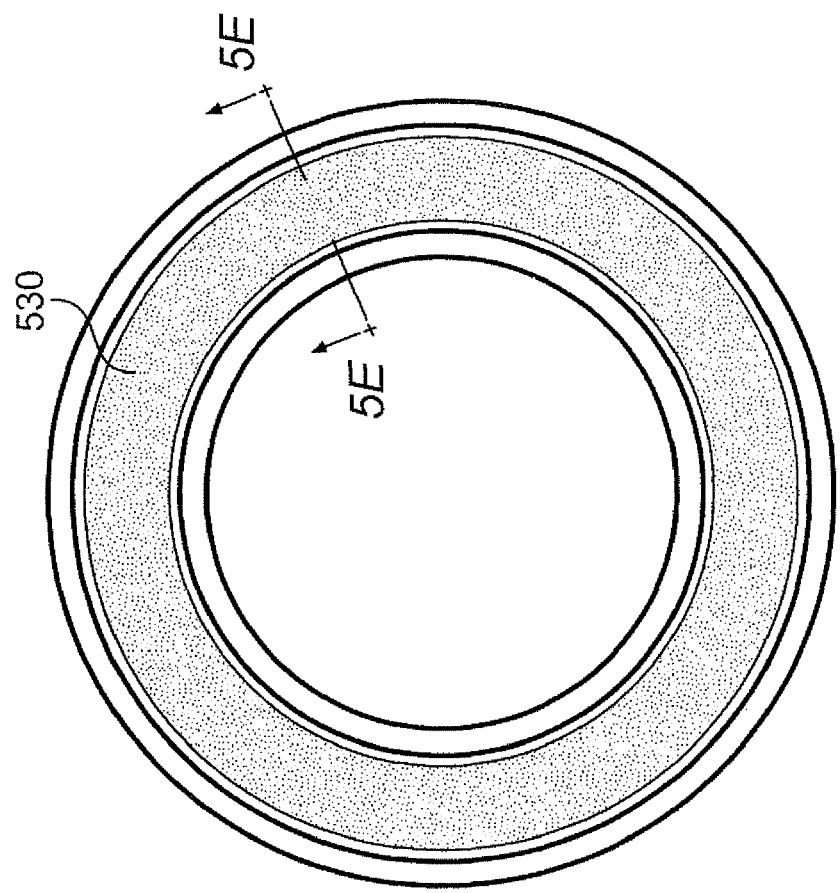
FIG. 5D is a schematic diagram that illustrates a bearing carrier having a single cavity holding a plurality of contiguous pads that form an annular pad, according to an embodiment of the present invention.
Figure 5F:
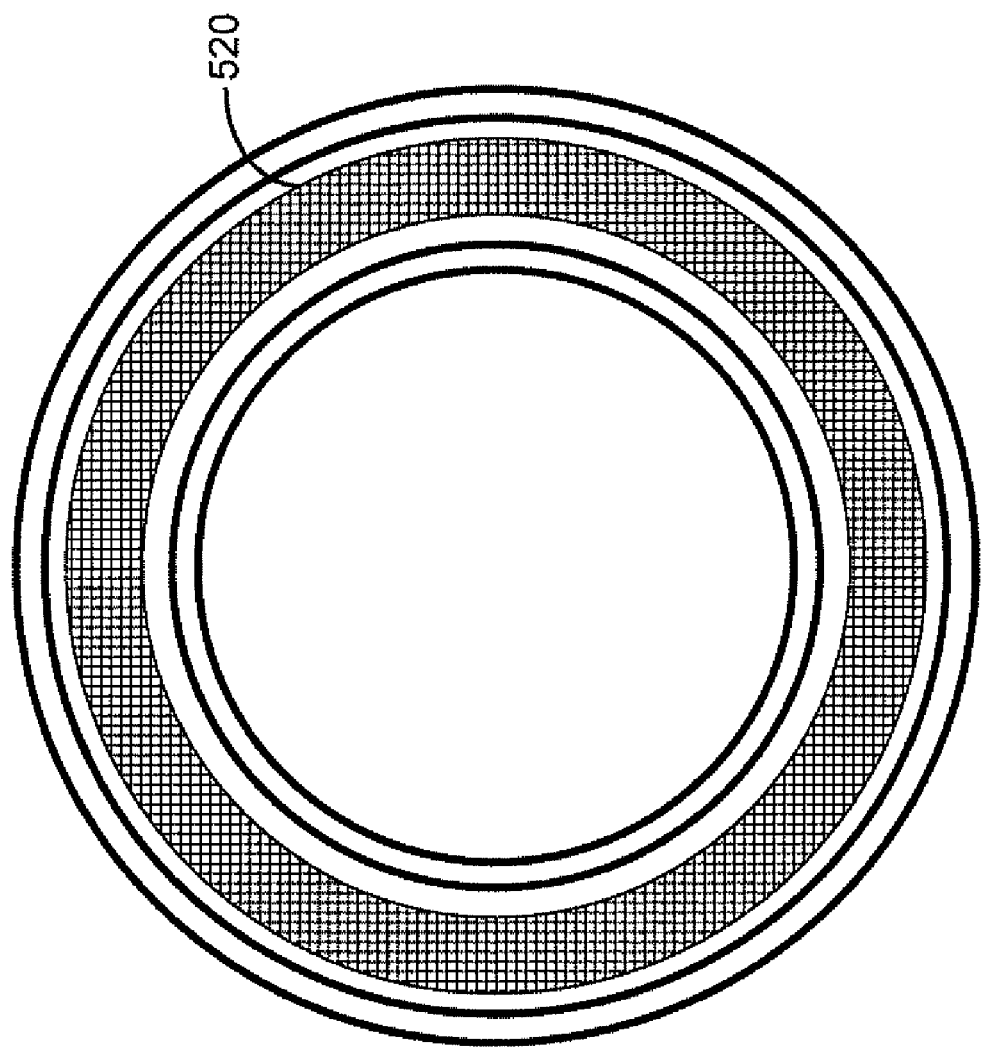
FIG. 5F is a schematic diagram that illustrates a single deflection element disposed in a single annular cavity of a bearing carrier, according to an embodiment of the present invention.

In another exemplary implementation, as shown in FIGS. 5D and 5E, the at least one annular cavity is a single cavity holding a plurality of contiguous pads 530 that form an annular pad over one large or many small deflection elements 532, such as Belleville washers. As shown in this example, pads 530 are wedge-shaped pads that fit snugly together in a contiguous arrangement, with minimal gaps in between, to form the annular pad. Each pad can be disposed over a separate deflection element 532 as shown in FIG. 5E. Alternatively, multiple pads can be disposed over a single deflection element. For example, all of the pads 530 can be disposed over a single deflection element, such as that shown in FIG. 5F. In addition, instead of the eight separate pads shown in FIG. 5D, a different number of pads could be used. In one example, a single integral annular pad can be used that is disposed over one or more deflection elements.

Figure 6:
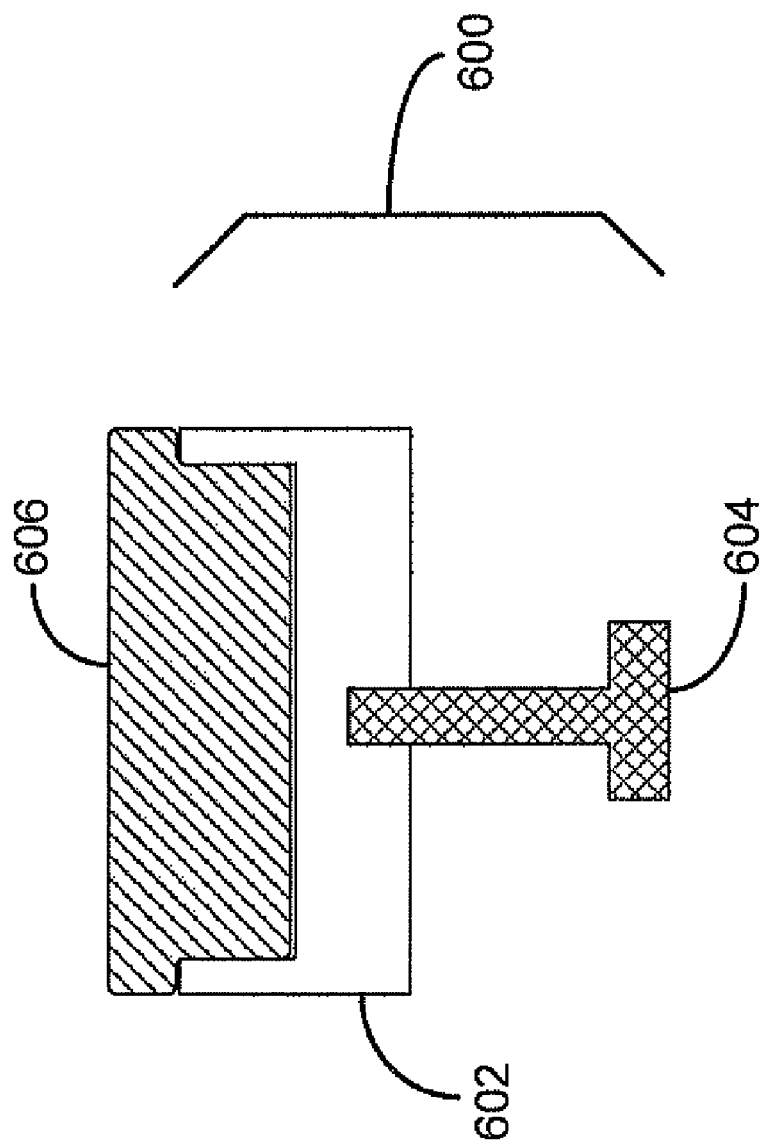
FIG. 6 is a schematic diagram that illustrates a pad holder assembly for securing a pad to a bearing carrier, according to an embodiment of the present invention.

A further aspect of the present invention provides a pad holder assembly that secures a pad to the stationary bearing carrier. For example, as shown in FIG. 6, a pad holder assembly 600 comprises a pad holder 602 and a fastener 604 that attaches the pad holder to the bearing carrier. The pad holder 602 can be made of metal carbide (e.g., metal silicone carbide) to which a silicone carbide pad is attached. In one implementation, as shown in the cross-sectional view of FIG. 6, the pad holder 602 is cup shaped, with the pad 606 disposed inside the cup and projecting above the cup. The fastener 604 of the pad holder assembly can comprise a bolt, which can be disposed through an opening in the bearing carrier and threaded into a tapped opening of the pad holder 602. Fastener 604 can be configured to move freely within an opening of the bearing carrier such that the pad holder and pad can float above a surface of the bearing carrier. A head of the fastener can limit the travel of the pad holder assembly. A deflection element can be disposed between the underside of the holder (i.e., the side of the pad holder 602 opposite to the side on which the pad 606 is disposed) and the surface of the bearing carrier. The deflection element provides a resistance and deflection appropriate for the deflection element to contact and deflect against the force of the bearing runner.

Figure 7A:
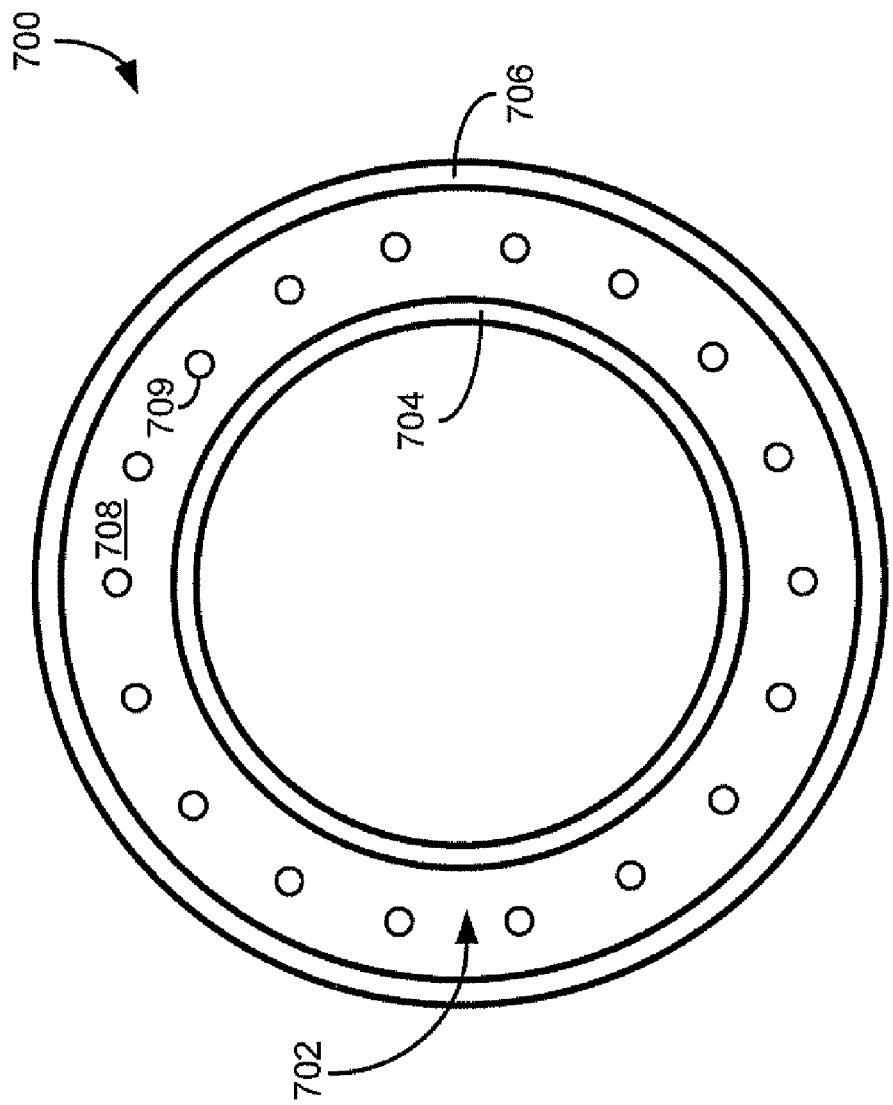
FIG. 7A is a schematic diagram that illustrates a bearing carrier having a single annular cavity with openings to receive pad holder assemblies, according to an embodiment of the present invention.
Figure 7C:
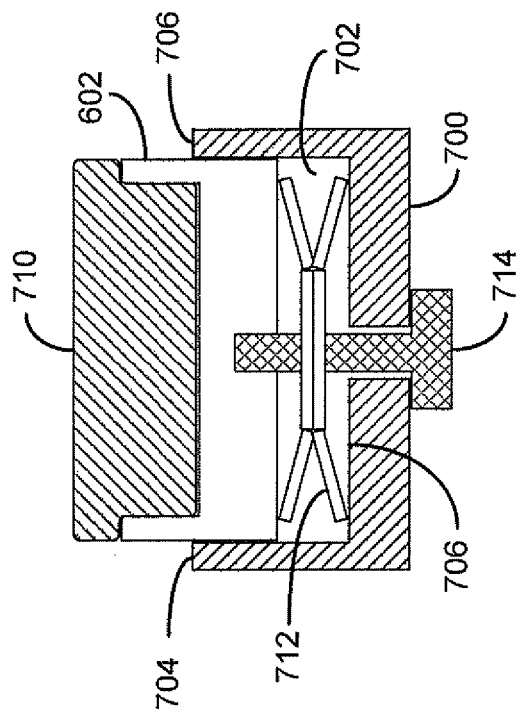
FIG. 7C is a schematic diagram that illustrates a cross-sectional view of the bearing carrier of FIG. 7B taken along line 7C-7C.
Figure 7B:
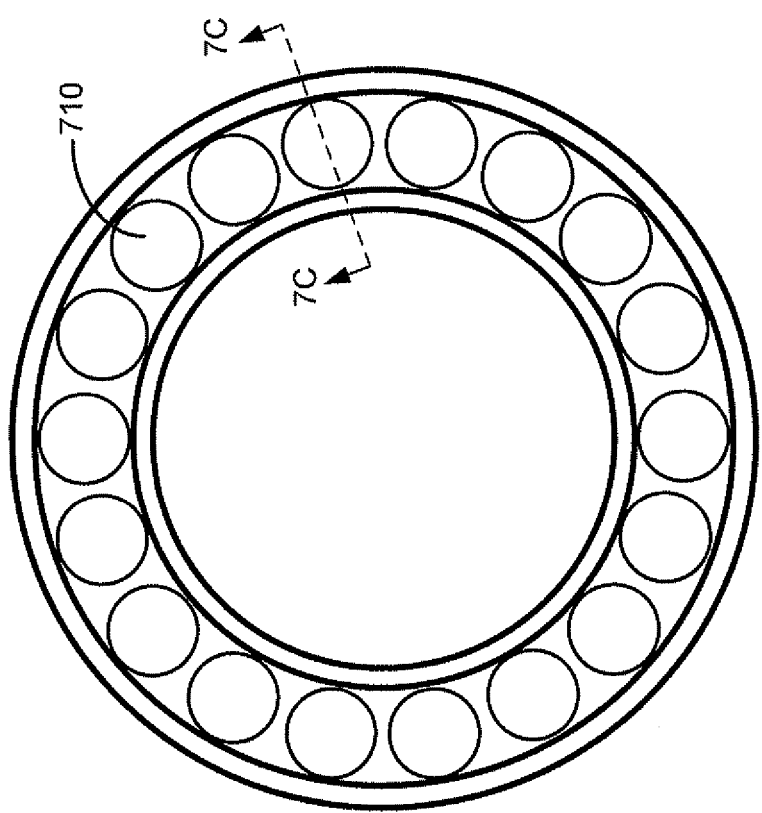
FIG. 7B is a schematic diagram of the bearing carrier of FIG. 7A with multiple pads installed therein, according to an embodiment of the present invention.

FIGS. 7A-7C illustrate the use of pad holder assemblies with a stationary bearing carrier having a single annular cavity, according to an embodiment of the present invention. As shown in FIG. 7A, the stationary bearing carrier 700 has a singular annular cavity 702 defined by walls 704, 706 and a bottom surface 708. Bottom surface 708 defines openings 709 through which to receive pad holder assemblies. The openings 709 can be equally spaced annularly around the stationary bearing carrier 700 at distances suitable for the size of the pad holder assemblies and pads. FIG. 7B illustrates pads 710, in their pad holder assemblies, installed in the stationary bearing carrier 700, according to an embodiment of the present invention. The cross-sectional view of FIG. 7C illustrates the pad holder assembly disposed inside the cavity 702. A deflection element 712 is disposed between the underside of the pad holder 602 and the bottom surface 706 of the stationary bearing carrier 700. Before use, the deflection element is preferably initially biased to keep the components from moving appreciably. In this configuration, the pad holder assembly and pad can float in a direction generally along the axis of the fastener 714, as varying forces applied against the pad 710 cause the deflection element 712 to compress and expand. The fastener 714 and the walls 704, 706 of the stationary bearing carrier 700 keep the pad properly positioned.

Figure 8A:
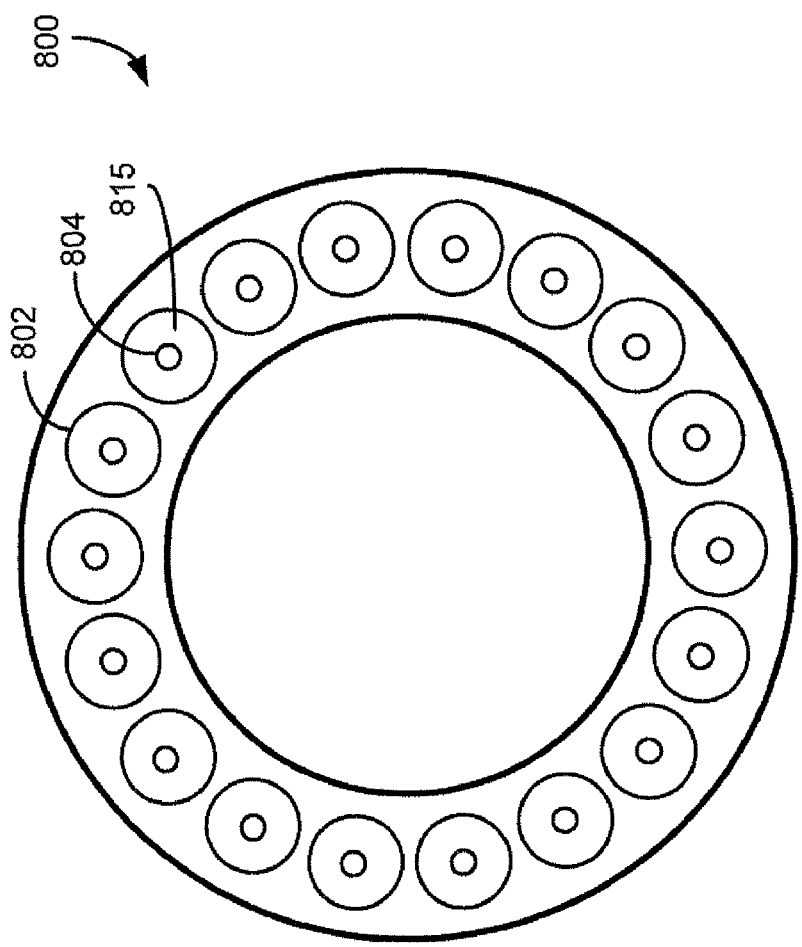
FIG. 8A is a schematic diagram that illustrates a bearing carrier having cavities to receive pad holder assemblies, according to an embodiment of the present invention.

According to another embodiment of the present invention, FIGS. 8A-8C illustrate the use of pad holder assemblies with a stationary bearing carrier having a plurality of cavities equally spaced annularly around the carrier. As shown in FIG. 8A, a stationary bearing carrier 800 has a plurality of cavities 802 equally spaced apart around the annular carrier 800. The bottom surface 815 of each cavity 802, preferably at the center, defines an opening 804 for receiving a fastener 816 of a pad holder assembly. FIG. 8B illustrates the pads 810, with their pad holder assemblies, installed in the openings 804 of the stationary bearing carrier 800. As shown in the cross-sectional view of FIG. 8C, the pad holder assembly is disposed inside a cavity 802. A deflection element 812 is disposed between the underside of the pad holder 814 and the bottom surface 815 of the cavity 802. Before use, the deflection element 812 is preferably initially biased to keep the components from moving appreciably. In this configuration, the pad holder assembly and pad 810 can float in a direction generally along the axis of the fastener 816, as varying forces applied against the pad 810 cause the deflection element 812 to compress and expand. The fastener 816 and the walls 820, 822 of the stationary bearing carrier 800 keep the pad properly positioned.

The upper surface 817 of the stationary bearing carrier 800 can be flat as shown in FIGS. 8A-8C, or optionally, can have projecting sidewalls such a walls 704, 706 of stationary bearing carrier 700 (FIG. 7A). In one embodiment, the stationary bearing carrier 800 is manufactured starting with a ring having flat sides, with the cavities 802 bored into the ring and the openings 804 drilled through the ring.

Figure 9A:
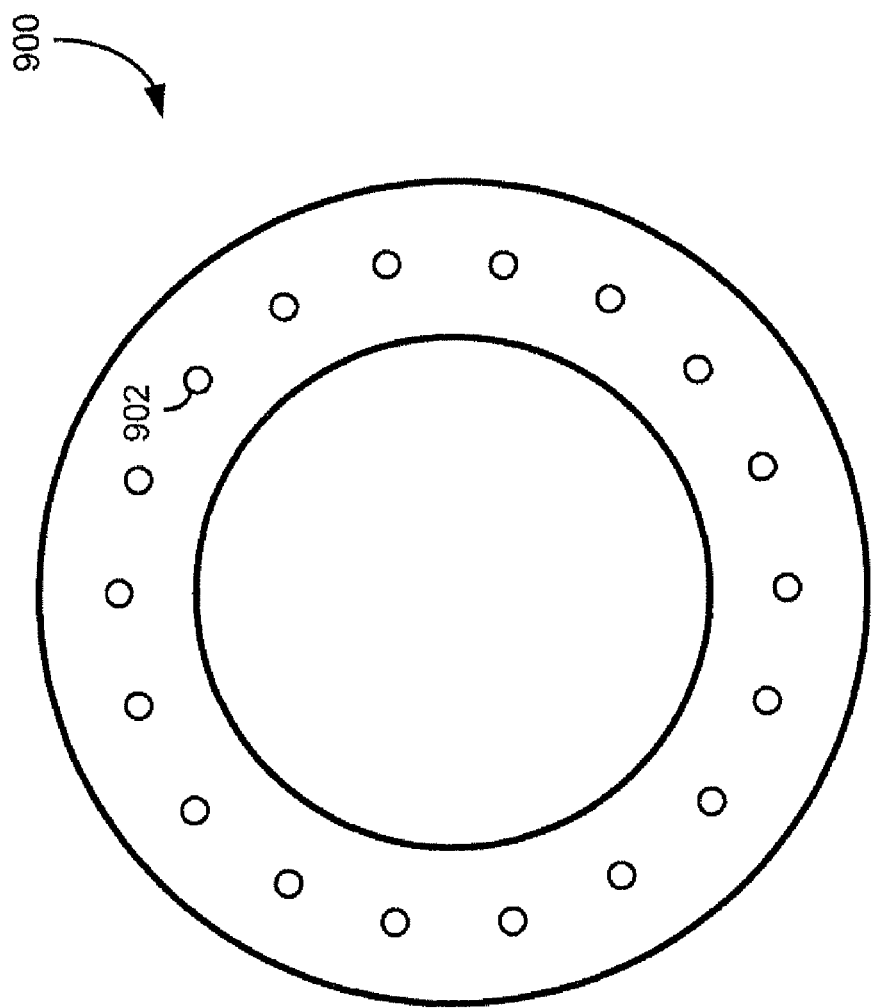
FIG. 9A is a schematic diagram that illustrates a flat bearing carrier having openings to receive pad holder assemblies, according to an embodiment of the present invention.
Figure 9C:
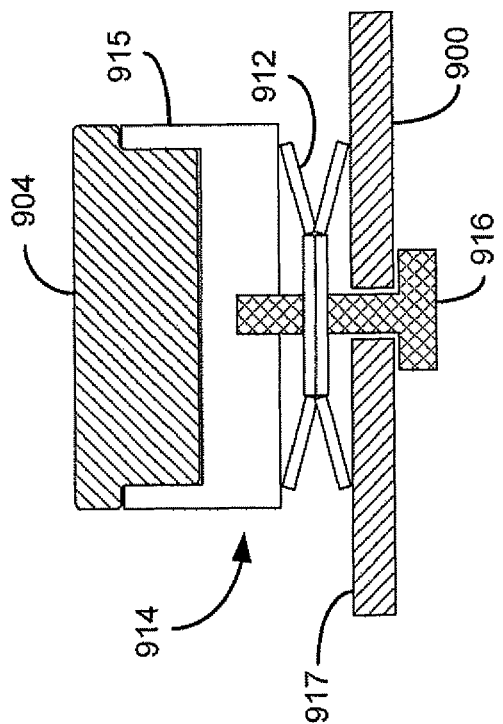
FIG. 9C is a schematic diagram that illustrates a cross-sectional view of the bearing carrier of FIG. 9B taken along line 9C-9C.
Figure 9B:
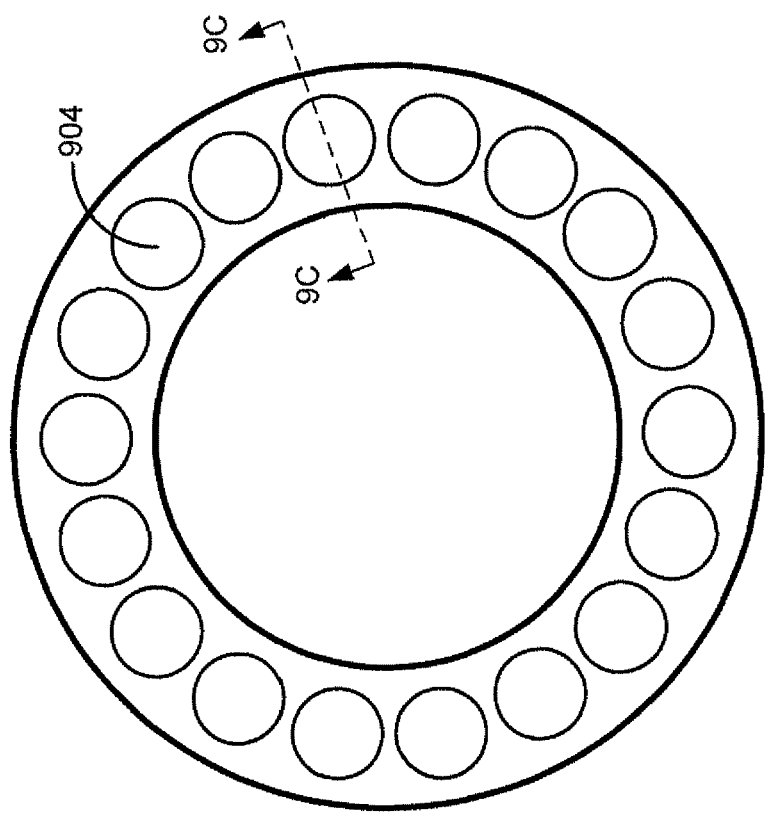
FIG. 9B is a schematic diagram of the bearing carrier of FIG. 9A with multiple pads installed therein, according to an embodiment of the present invention.

According to another embodiment of the present invention, FIGS. 9A-9C illustrate the use of pad holder assemblies with a stationary bearing carrier that is substantially flat and does not have cavities in which to receive the pads and pad holder assemblies. For example, as shown in FIG. 9A, pad holder assembly openings 902 are provided annularly around a flat stationary bearing carrier 900. Each opening receives a pad and its pad holder assembly. FIG. 9B illustrates the pads 904, with their pad holder assemblies, installed in the openings 902 of the stationary bearing carrier 900. As shown in the cross-sectional view of FIG. 9C, the pad holder assembly 914 is disposed over the flat surface 917 of the stationary bearing carrier 900. A deflection element 912 is disposed between the underside of the pad holder 915 and the flat surface 917 of the stationary bearing carrier 900. Before use, the deflection element 912 is preferably initially biased to keep the components from moving appreciably. In this configuration, the pad holder assembly 914 and pad 904 can float in a direction generally along the axis of the fastener 916, as varying forces applied against the pad 904 cause the deflection element 912 to compress and expand. The fastener 916 keeps the pad 904 properly positioned.

Figure 10B:
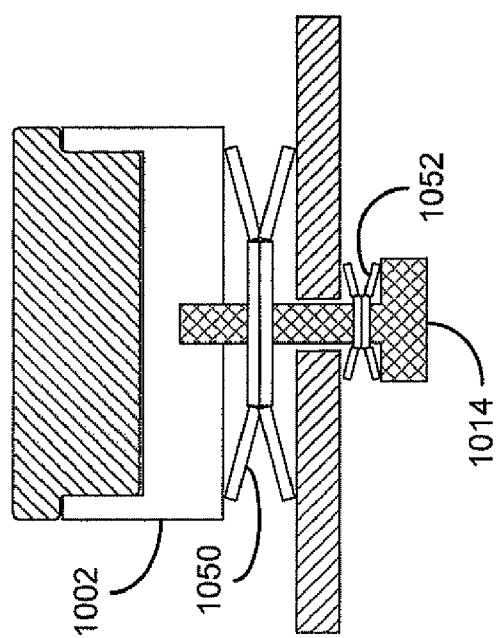
FIGS. 10A and 10B are schematic diagrams that illustrate the use of a plurality of deflection elements for each pad holder assembly, according to embodiments of the present invention.
Figure 10A:
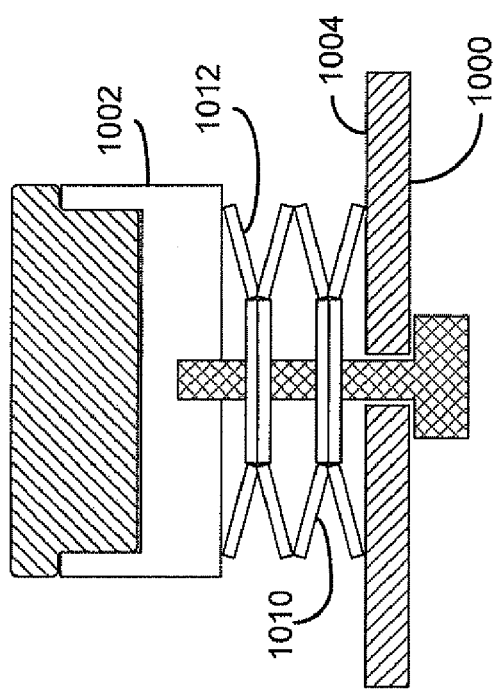

A further aspect of the present invention provides a plurality of deflection elements for each pad holder assembly. As shown in FIG. 10A, for example, two stacked deflection elements 1010, 1012 can be provided between the underside of the pad holder 1002 and a surface 1004 of the stationary bearing carrier 1000. As another example, FIG. 10B illustrates a first deflection element 1050 provided between the underside of the pad holder 1002 and a first side of the stationary bearing carrier 1000, and a second deflection element 1052 provided between the end of the fastener 1014 (e.g., a bolt) and the second side of the stationary bearing carrier 1000 opposite to the first side. Using a plurality of deflection elements can improve the durability of the assembly and accommodate a wider range of loads. In addition, multiple deflection elements can help maintain the pad holder assembly at an orientation generally orthogonal to the stationary bearing carrier, especially when the opening in the stationary bearing carrier is appreciably larger than the fastener of the pad holder assembly.

Figure 11B:
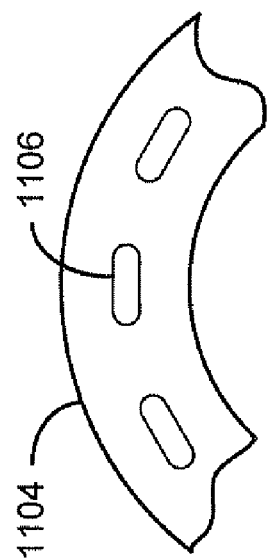
FIGS. 11A and 11B are schematic diagrams that illustrate partial views of bearing carriers having alternatively shaped openings to receive pad holder assemblies, according to embodiments of the present invention.
Figure 11A:
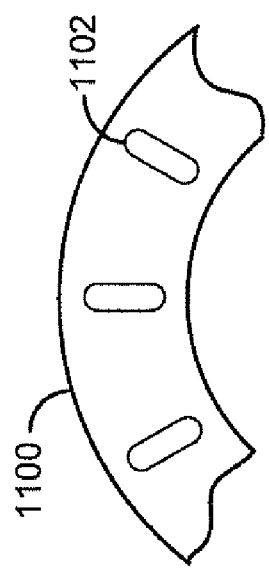

According to alternative embodiments of the present invention, the opening that receives the fastener of a pad holder assembly can have a shape that allows lateral movement of the pad holder assembly. For example, in the case of a cylindrical fastener, the opening can have a shape other than a circular shape. For example, the opening could be slot shaped as shown in FIGS. 11A and 11B The slot shape enables the pad and pad holder assembly to not only float in a direction perpendicular to the face of the stationary bearing carrier, but also in a direction parallel to the face of the stationary bearing carrier, as well as in any combination of those directions. Permitting the pads to travel in the parallel direction can accommodate manufacturing variances in closely spaced pads and pad holder assemblies, and can make assembly more convenient. Slots can also limit parallel travel in operation, which can provide advantages in properly locating the pads with respect to the bearing runner. As an example, a slot 1102 can extend radially from a center point of the stationary bearing carrier 1100 as shown in FIG. 11A. As another example, a slot 1106 can extend along an arc of the stationary bearing carrier 1104 as shown in FIG. 11B. Slot 1106 could, of course, have an orientation other than the linear orientation shown in FIG. 11B, for example, having a curved shape to match the arc of the perimeter of stationary bearing carrier 1104.

Figure 12B:
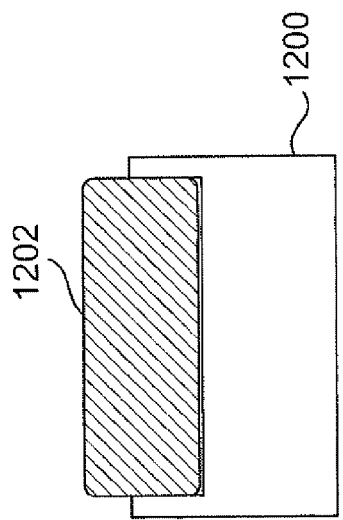
FIG. 12B is a schematic diagram that illustrates a cross-sectional view of the bearing runner of FIG. 12A taken along line 12B-12B.
Figure 12A:
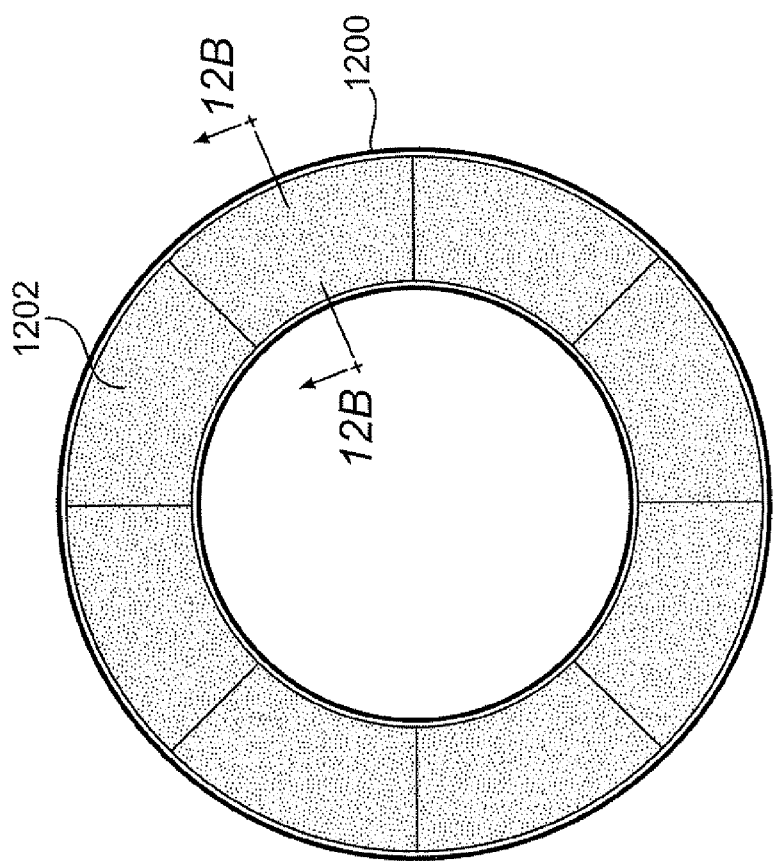
FIG. 12A is a schematic diagram that illustrates an exemplary bearing runner having a plurality of contiguous wear pads, according to an embodiment of the present invention.
Figure 12D:
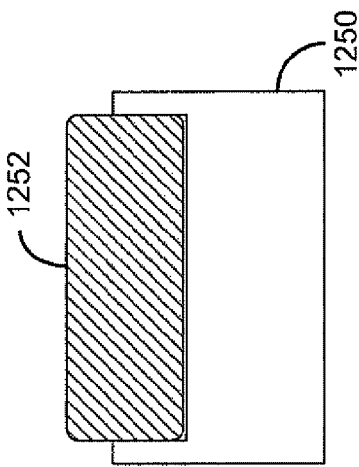
FIG. 12D is a schematic diagram that illustrates a cross-sectional view of the bearing runner of FIG. 12C taken along line 12D-12D.
Figure 12C:
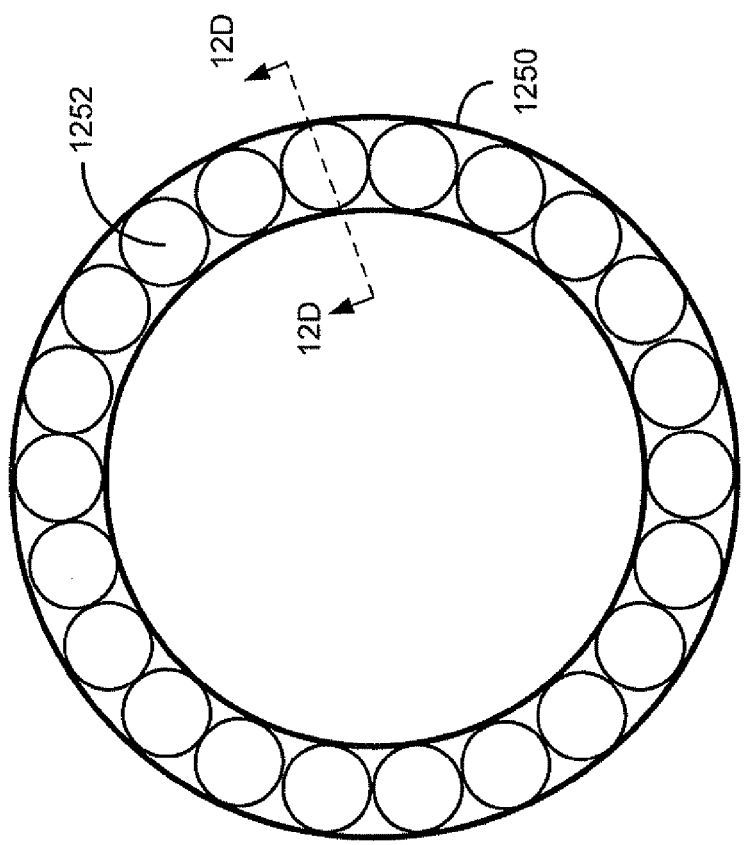
FIG. 12C is a schematic diagram that illustrates an exemplary bearing runner having a plurality of circular wear pads, according to an embodiment of the present invention.

FIGS. 12A-12D illustrate exemplary bearing runners according to alternative embodiments of the present invention. Instead of a single continuous wear resistant ring (such as the rings 111 shown in FIGS. 4A-4C), these alternative embodiments provide bearing runners having a plurality of individual wear pads. For example, FIGS. 12A and 12B illustrate an exemplary bearing runner 1200 having a plurality of contiguous wear pads 1202, which in this case are wedge-shaped pads that are fit snugly together in a contiguous arrangement. As another example, FIGS. 12C and 12D illustrate an exemplary bearing runner 1250 having a plurality of circular wear pads 1252. Thus, it should be understood that the present invention is not limited to bearing runners having a continuous wear resistant face.

Figure 13B:
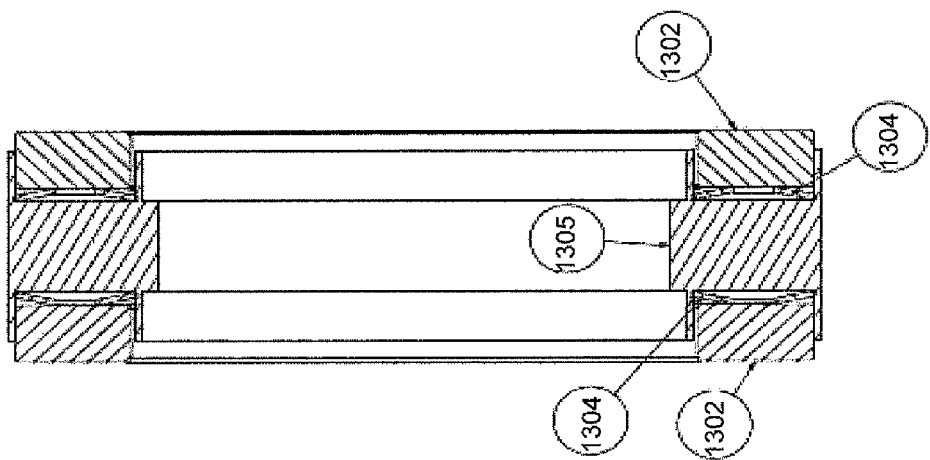
FIG. 13B is a schematic diagram that illustrates a cross-sectional view of the bearing runner of FIG. 13A taken along line 13B-13B.
Figure 13A:
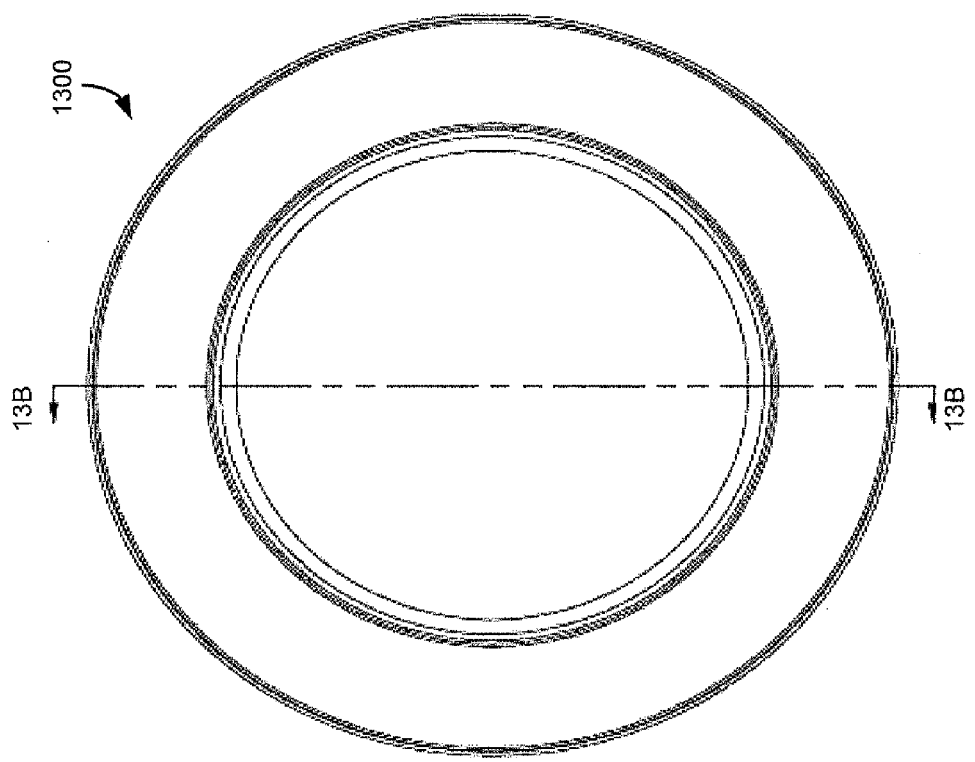
FIG. 13A is a schematic diagram that illustrates an exemplary bearing runner having wear resistant rings disposed over one or more deflection elements, according to an embodiment of the present invention.

According to another embodiment of the present invention, a bearing runner can have one or more deflection elements in addition to, or instead of, providing one or more deflection elements on the bearing carrier. FIGS. 13A and 13B illustrate an exemplary bearing runner 1300 having a wear resistant ring 1302 on each of its faces. Each ring 1302 is disposed over one or more deflection elements 1304, which can be one or more Belleville washers, for example. The one or more deflection elements 1304 are disposed between the ring 1302 and the base structure 1305 of the bearing runner. Alternatively, instead of a single wear resistant ring, the bearing runner could have multiple individual wear pads (such as those shown in FIGS. 12A and 12C) disposed on one or more deflection elements. With the bearing runner having one or more deflection elements, the bearing carrier need not have one or more deflection elements and can be, for example, a standard bearing carrier having tilt pads or deflection pads as known in the art.

Figure 14B:
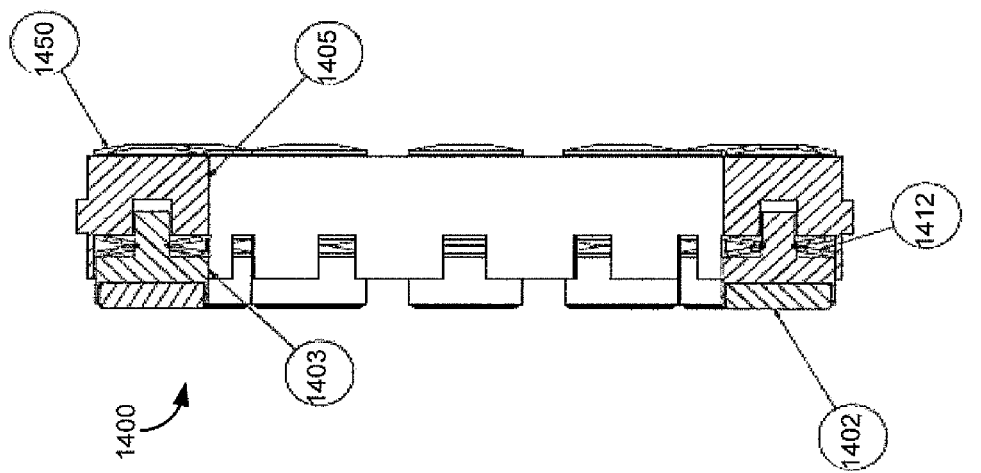
FIG. 14B is a schematic diagram that illustrates a cross-sectional view of the bearing carrier of FIG. 14A taken along line 14B-14B.
Figure 14A:
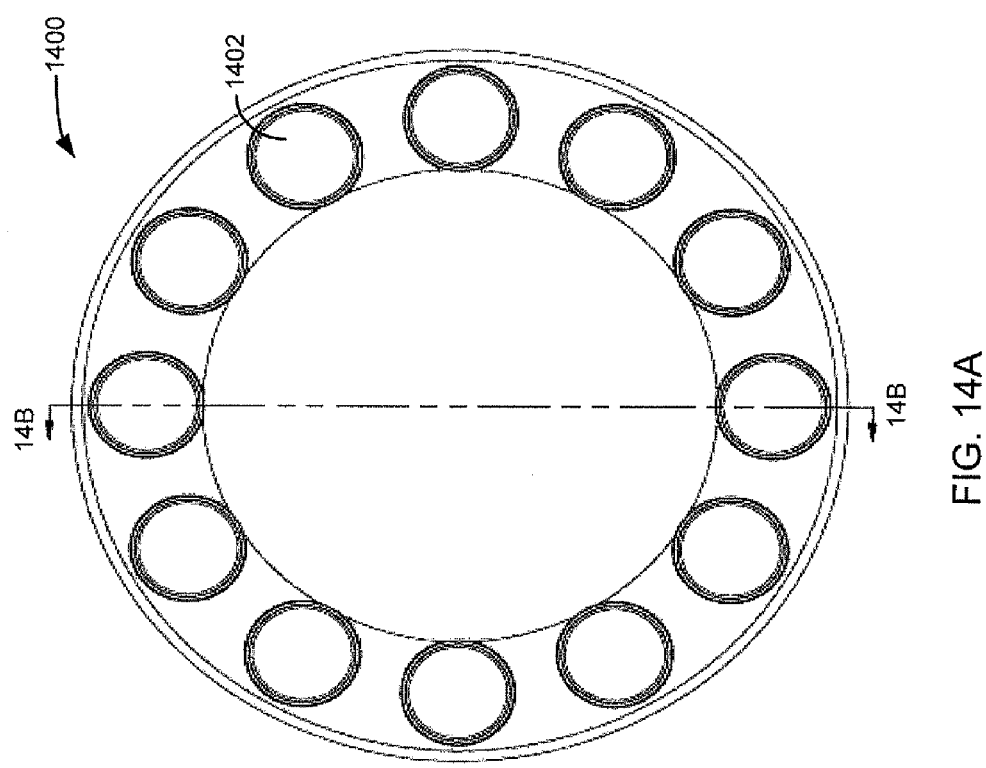
FIG. 14A is a schematic diagram that illustrates an exemplary bearing carrier having a plurality of wear pads, with the bearing carrier disposed over one or more external deflection elements, according to an embodiment of the present invention.

According to another embodiment of the present invention, one or more deflection elements can be provided on a side (i.e., under or behind) of a bearing carrier opposite to the side on which the thrust pads of the bearing carrier are disposed. For example, in a stack bearing assembly, the one or more deflection elements can be disposed under, or behind, the bearing carrier. Those one or more deflection elements can be used instead of; or in addition to, deflection elements on which thrust pads of the bearing carrier are disposed. As an example, FIGS. 14A and 14B illustrate an exemplary bearing carrier 1400 having a plurality of wear pads 1402, with the bearing carrier 1400 disposed over one or more external deflection elements 1450 (as shown in the cross-sectional view of FIG. 14B). In addition to deflection elements 1450, in this embodiment, bearing carrier also has one or more deflection elements 1412 disposed between the pad holder 1403 and base structure 1405 of the bearing carrier 1400. As shown, in this embodiment, the pad holder 1403 is disposed within a cavity defined in the base structure 1405 that does not extend through to the side of the bearing carrier on which the external deflection elements 1450 are disposed, such that the external deflection elements 1450 are separated from the pad holder 1403 by base structure 1405 and are in this manner independent of the pad holder 1403. With reference to FIGS. 14A and 14B, in an alternative embodiment, deflection elements 1412 are not provided and instead, conventional tilt pads or deflection pads are used.

Although embodiments of the present invention presented herein describe a bearing runner as rotating and a corresponding bearing carrier as stationary, one of ordinary skill in the art would appreciate that the present invention applies equally to any configuration in which there is relative movement between a bearing runner and a bearing carrier. For example, the present invention applies equally to configurations in which the bearing runner is stationary and the bearing carrier rotates. In an alternative configuration using a rotating bearing carrier, the bearing carrier would be connected to the drive shaft and the bearing runner would be independent of the shaft. Thus, notwithstanding the particular configurations described herein, the present invention should be considered broadly applicable to any relative movement between a bearing carrier and a corresponding bearing runner.

In configurations of relative movement between a bearing carrier and a corresponding bearing runner, if external deflection elements (such as elements 1450 of FIG. 14B) are used, those external deflection elements are preferably provided behind, or under, the stationary member of the configuration. Thus, for example, the bearing carrier of FIGS. 14A and 14B is preferably a stationary member. As another example, with a one-sided bearing runner (i.e., a bearing runner having a wear face on only one side) disposed over one or more external deflection elements, the bearing runner is preferably the stationary member.

Although embodiments of the present invention have been described in the context of downhole drilling motors, one of ordinary skill in the art would appreciate that the thrust bearing assemblies of the present invention are equally applicable to other applications for thrust bearings, such as in rock crushing equipment. Therefore, notwithstanding the particular benefits associated with applying the present invention to drilling motors, the present invention should be considered broadly applicable to any application in need of thrust bearings.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A thrust bearing assembly comprising:
  a bearing runner having a wear resistant face;
  a bearing carrier defining a plurality of thrust pad sites disposed annularly around the bearing carrier, the bearing carrier having a first side facing the wear resistant face of the bearing runner and a second side opposite to the first side, and the bearing runner and the bearing carrier defining a longitudinal axis;
  a thrust pad disposed on the first side of the bearing carrier at a thrust pad site of the plurality of thrust pad sites, the thrust pad contacting the wear resistant face of the bearing runner; and
  a deflection element disposed between the thrust pad and the first side of the bearing carrier,
  wherein during operation the bearing carrier limits movement of the thrust pad in a direction generally radial to the longitudinal axis while allowing the thrust pad to move in a direction generally parallel to the longitudinal axis such that the thrust pad compresses and releases the deflection element.

2. The thrust bearing assembly of claim 1, wherein the bearing carrier defines at least one annular cavity, and wherein the deflection element is disposed in the at least one annular cavity.

3. The thrust bearing assembly of claim 1, wherein, at the thrust pad site of the plurality of thrust pad sites, the bearing carrier defines an opening in which a pad holder assembly is disposed, and wherein the thrust pad is disposed in the pad holder assembly.

4. The thrust bearing assembly of claim 3, wherein the pad holder assembly comprises a pad holder and a fastener, wherein the fastener is disposed through the opening and connected to the pad holder, and wherein the fastener retains the pad holder to the bearing carrier.

5. The thrust bearing assembly of claim 3, wherein the bearing carrier comprises two opposing walls and a bottom surface that define a single annular cavity, and wherein the pad holder assembly is disposed within the single annular cavity.

6. The thrust bearing assembly of claim 1, wherein the bearing carrier comprises two opposing walls and a bottom surface that define a single annular cavity in which the thrust pad is disposed, wherein each thrust pad site of the plurality of thrust pad sites comprises a thrust pad, and wherein the thrust pads are contiguous to form an annular pad around the bearing carrier.

7. The thrust bearing assembly of claim 1, wherein each thrust pad site of the plurality of thrust pad sites comprises an opening through the bearing carrier and a pad holder assembly disposed through the opening, and wherein the thrust pad is disposed in the pad holder assembly.

8. The thrust bearing assembly of claim 1, wherein the bearing runner comprises a base structure, a wear resistant ring disposed over the base structure, and a deflection element disposed between the base structure and the wear resistant ring, wherein the wear resistant ring provides the wear resistant face.

9. The thrust bearing assembly of claim 1, wherein the bearing runner comprises a base structure, a plurality of wear pads disposed over the base structure, and one or more deflection elements disposed between the base structure and the plurality of wear pads, wherein the plurality of wear pads provides the wear resistant face.

10. The thrust bearing assembly of claim 1, wherein the thrust pad is disposed in a pad holder, wherein the pad holder is disposed in a cavity defined in the first side of the bearing carrier, wherein the cavity does not extend through to the second side of the bearing carrier, and wherein the bearing carrier further comprises one or more external deflection elements disposed on the second side that are independent of the pad holder.

11. A bearing carrier comprising:
an annular base structure having a first side configured to contact a bearing runner and a second side opposite to the first side, the base structure defining a longitudinal axis;
a plurality of thrust pad sites disposed annularly around the first side of the base structure;
a thrust pad disposed on the first side of the base structure at a thrust pad site of the plurality of thrust pad sites, the thrust pad configured to contact the bearing runner; and
a deflection element disposed between the thrust pad and the first side of the base structure,
wherein during use the base structure limits movement of the thrust pad in a direction generally radial to the longitudinal axis while allowing the thrust pad to move in a direction generally parallel to the longitudinal axis such that the thrust pad compresses and releases the deflection element.

12. The bearing carrier of claim 11, wherein the base structure defines at least one annular cavity, and wherein the deflection element is disposed in the at least one annular cavity.

13. The bearing carrier of claim 11, wherein, at the thrust pad site of the plurality of thrust pad sites, the base structure defines an opening in which a pad holder assembly is disposed, and wherein the thrust pad is disposed in the pad holder assembly.

14. The bearing carrier of claim 13, wherein the pad holder assembly comprises a pad holder and a fastener, wherein the fastener is disposed through the opening and connected to the pad holder, and wherein the fastener retains the pad holder to the base structure.

15. The bearing carrier of claim 14, wherein the fastener comprises a head that is larger than the opening and is disposed on the second side of the base structure.

16. The bearing carrier of claim 15, further comprising a second deflection element disposed between the head of the fastener and the second side of the base structure.

17. The bearing carrier of claim 13, wherein the opening is slot shaped.

18. The bearing carrier of claim 17, wherein the slot shaped opening extends in a direction radially from a center point of the bearing carrier.

19. The bearing carrier of claim 17, wherein the slot shaped opening extends along an arc of the bearing carrier.

20. The bearing carrier of claim 19, wherein the slot shaped opening has a linear shape.

21. The bearing carrier of claim 11, further comprising a second deflection element disposed between the thrust pad and the first side of the base structure.

22. The bearing carrier of claim 11, wherein the base structure comprises two opposing walls and a bottom surface that define a single annular cavity in which the thrust pad is disposed, and wherein each thrust pad site of the plurality of thrust pad sites comprises a thrust pad, and wherein the thrust pads are contiguous to form an annular pad around the bearing carrier.

23. The bearing carrier of claim 11, wherein each thrust pad site of the plurality of thrust pad sites comprises a cavity bored into the base structure.

24. The bearing carrier of claim 11, wherein each thrust pad site of the plurality of thrust pad sites comprises an opening through the base structure and a pad holder assembly disposed through the opening, and wherein the thrust pad is disposed in the pad holder assembly.

25. The bearing carrier of claim 24, wherein the first and second sides of the base structure are flat.

26. The bearing carrier of claim 24, wherein the each thrust pad site comprises a cavity, wherein a bottom surface of the cavity defines the opening, and wherein the pad holder assembly is disposed within the cavity.

27. The bearing carrier of claim 11, wherein each thrust pad site of the plurality of thrust pad sites comprises a thrust pad, and wherein a single deflection element is disposed annularly around the base structure between the thrust pads of the plurality of thrust pad sites and the first side of the base structure.

28. The bearing carrier of claim 11, wherein the bearing carrier further comprises one or more external deflection elements disposed on the second side.

29. The bearing carrier of claim 11, wherein the thrust pad is disposed in a pad holder, wherein the pad holder is disposed in a cavity defined in the first side of the base structure, wherein the cavity does not extend through to the second side of the base structure, and wherein the bearing carrier further comprises one or more external deflection elements disposed on the second side that are independent of the pad holder.

30. A thrust bearing assembly comprising:
a bearing runner; and
a bearing carrier in contact with the bearing runner, the bearing runner and the bearing carrier defining a longitudinal axis,
wherein one of the bearing runner and the bearing carrier has a wear resistant face,
wherein the other of the bearing runner and the bearing carrier defines a plurality of annularly disposed thrust pad sites, and
wherein the other of the bearing runner and the bearing carrier comprises:
a thrust pad disposed on a first side facing the wear resistant face of the one of the bearing runner and the bearing carrier, the thrust pad disposed at a thrust pad site of the plurality of thrust pad sites, the thrust pad contacting the wear resistant face, and a deflection element disposed between the thrust pad and the first side, wherein during operation the other of the bearing runner and the bearing carrier limits movement of the thrust pad in a direction generally radial to the longitudinal axis while allowing the thrust pad to move in a direction generally parallel to the longitudinal axis such that the thrust pad compresses and releases the deflection element.

* * * * *